US 11,346,742 B2

(12) United States Patent
Vogt et al.

(10) Patent No.: US 11,346,742 B2
(45) Date of Patent: May 31, 2022

(54) DEVICE AND METHOD FOR LEAKAGE TESTING OF A CONNECTION BETWEEN A RUBBER STOPPER AND A CORRESPONDING DRUG CONTAINER

(71) Applicant: Lonza Ltd, Visp (CH)

(72) Inventors: Martin Vogt, Allschwil (CH); Roman Mathaes, Basel (CH); Hanns-Christian Mahler, Loerrach (DE); Atanas Koulov, Basel (CH); Gabriele Roidl, Erlinsbach (CH); Franziska Riesen Fuchs, Aarau (CH)

(73) Assignee: Lonza Ltd, Visp (CH)

( * ) Notice: Subject to any disclaimer, the term of this patent is extended or adjusted under 35 U.S.C. 154(b) by 0 days.

(21) Appl. No.: 17/295,999

(22) PCT Filed: Nov. 22, 2019

(86) PCT No.: PCT/EP2019/082311
§ 371 (c)(1),
(2) Date: May 21, 2021

(87) PCT Pub. No.: WO2020/104688
PCT Pub. Date: May 28, 2020

(65) Prior Publication Data
US 2021/0389206 A1    Dec. 16, 2021

Related U.S. Application Data

(60) Provisional application No. 62/770,872, filed on Nov. 23, 2018.

(30) Foreign Application Priority Data

Nov. 23, 2018  (EP) ..................................... 18208050
Dec. 4, 2018   (EP) ..................................... 18210253

(Continued)

(51) Int. Cl.
*G01M 3/22*    (2006.01)
*G01M 3/20*    (2006.01)
(Continued)

(52) U.S. Cl.
CPC ............ *G01M 3/229* (2013.01); *G01M 3/002* (2013.01); *G01M 3/186* (2013.01); *G01M 3/202* (2013.01); *G01M 3/223* (2013.01); *G01M 3/226* (2013.01)

(58) Field of Classification Search
CPC ...... G01M 3/186; G01M 3/226; G01M 3/229; G01M 3/202
See application file for complete search history.

(56) References Cited

U.S. PATENT DOCUMENTS 8,316,697 B1   11/2012   Tuomela et al.
9,579,458 B2   2/2017    Holmqvist
(Continued)

FOREIGN PATENT DOCUMENTS

CN   201002789 Y   1/2008
CN   201828385     5/2011
(Continued)

OTHER PUBLICATIONS

International Search Report PCT/EP2019/082311 dated Jan. 6, 2020, 12 pages.

*Primary Examiner* — Paul M. West
(74) *Attorney, Agent, or Firm* — Dority & Manning, P.A.

(57) ABSTRACT

The invention concerns the field of container closure integrity (CCI) and the testing of CCI and relates to a device and a method for leakage testing of a connection between a rubber stopper and a corresponding drug container which can be used for storing drugs under sterile conditions and which is closed by said rubber stopper.

8 Claims, 30 Drawing Sheets

(30) Foreign Application Priority Data

Mar. 26, 2019 (EP) ..................................... 19165305
Oct. 11, 2019 (EP) ..................................... 19202709

(51) Int. Cl.
*G01M 3/18* (2006.01)
*G01M 3/00* (2006.01)

(56) References Cited

U.S. PATENT DOCUMENTS

| | | | |
|---|---|---|---|
| 2005/0236440 A1 | 10/2005 | Cho | |
| 2008/0312607 A1* | 12/2008 | Delmotte | A61M 5/31513 604/230 |
| 2018/0186528 A1* | 7/2018 | Tonn | B65D 81/3216 |
| 2018/0240540 A1* | 8/2018 | O'Keefe | A61J 7/0472 |
| 2021/0389206 A1 | 12/2021 | Vogt et al. | |

FOREIGN PATENT DOCUMENTS

| | | |
|---|---|---|
| CN | 104943963 A | 9/2015 |
| CN | 205293539 | 6/2016 |
| CN | 207816521 U | 9/2018 |
| DE | 102006047040 | 3/2008 |
| GB | 2222687 | 3/1990 |
| WO | WO2015108423 | 7/2015 |

\* cited by examiner

DEVICE AND METHOD FOR LEAKAGE TESTING OF A CONNECTION BETWEEN A RUBBER STOPPER AND A CORRESPONDING DRUG CONTAINER

CROSS REFERENCE TO RELATED APPLICATIONS

This application is the U.S. National Stage entry of International Application Number PCT/EP2019/082311 filed under the Patent Cooperation Treaty having a filing date of Nov. 22, 2019, which claims priority to U.S. Provisional Patent Application No. 62/770,872, having a filing date of Nov. 23, 2018, European Patent Application No. 18208050.7 having a filing date of Nov. 23, 2018, European Patent Application No. 18210253.3 having a filing date of Dec. 4, 2018, European Patent Application No. 19165305.4 having a filing date of Mar. 26, 2019, and European Patent Application No. 19202709.2 having a filing date of Oct. 11, 2019, which are incorporated herein by reference.

FIELD OF THE INVENTION

The invention concerns the field of container closure integrity (CCI) and the testing of CCI and relates to a device and a method for leakage testing of a connection between a rubber stopper and a corresponding drug container which can be used for storing drugs under sterile conditions and which is closed by said rubber stopper.

TECHNOLOGICAL BACKGROUND

A drug container, which can be used for storing drugs under sterile conditions and which is closed by a rubber stopper, can e.g. be a vial or a cartridge.

A vial, also known as a phial or flacon, is a small glass or plastic vessel or bottle which is often used to store medication as liquids or as solids such as powders or capsules. They can also be used as scientific sample vessels. In particular, vials are used as storage for small quantities of a solid material or a liquid used in pharmaceutical, medical or scientific applications, such as microbiology molecular biology or genetic applications.

A cartridge can be used to store compositions in liquid form.

A drug container usually comprises a top-side opening, which can also be referred to as a regular opening and which is herein referred to as a dispensing opening. The dispensing opening can be sealed by a correspondingly shaped rubber stopper. The dispensing opening it the opening via which the drugs in the drug container can be withdrawn from the drug container. The drugs can either be poured out via the dispensing opening or can be withdrawn though the rubber stopper by means of a needle cannula.

It is often of significant importance, e.g. in medical applications, to ensure integrity of the closure, in particular of the sealing provided by the rubber stopper, to avoid any contamination of the product stored in the drug container. During production, packaging or transport, or any other handling, the drug container may be exposed to an external influence, such that the rubber stopper may be displaced with respect to the drug container from its initial sealing position in an opening direction over such a distance that the container starts leaking.

In the prior art apparatus for actuating syringes are disclosed. For example, US 20170165424 A1 discloses a trigger operated syringe for intramammary injection of antibiotics. The syringe has a fluid containing syringe cartridge activated by a plunger which is inserted into the syringe cartridge and expels fluid when the trigger is pulled. A syringe cartridge holding mechanism holds the syringe cartridge in place until the trigger is released and the plunger retracted. Single syringe cartridge and multiple syringe cartridge versions are disclosed. The plunger moves in a direction which is effectively perpendicular to the direction of movement of the trigger, allowing for ease of injection to a cow's teats and ejection of the spent cartridges.

Also U.S. Pat. No. 6,712,794 B2 discloses an apparatus for delivering a viscous liquid to a surgical site. The apparatus employs a conventional syringe having a barrel and a plunger movable axially within the barrel from a withdrawn position to an inserted position. The apparatus includes an internally-threaded sleeve and a substantially cylindrical actuation element. The sleeve is configured to receive the plunger in its withdrawn position, and has an open proximal end and a distal end slot configured for receiving the syringe barrel therethrough. The actuation element has an externally-threaded distal portion dimensioned to screw into the proximal end of the sleeve, and a plunger seat, at the distal end of the actuation element, that bears against the plunger and that pushes the plunger axially toward its inserted position in the barrel as the actuation element is threaded into the sleeve.

Furthermore apparatus for leakage testing of vials are described. For example, DE 10 2006 047 040 B3 discloses an apparatus for determination of a plug seating height as well as a method for determining the package tightness in dependency of the plug seating height. The adjustment of the seating height of the plug in the vial is carried out by positioning of different distance elements between the vial and the plug. This apparatus is thus disadvantageous in that the adjustment of the seating height is cumbersome.

Finally, GB 2 222 687 A discloses a method for testing and verifying the fluid tightness of filled and hermetically sealed containers as well as an apparatus for the implementation of such a method. With this method and apparatus no movement of the cap relative to the vial is effected. Only the tightness of the cap, when inserted into the vial is being tested.

Therefore it is desirable to have an indication of the tolerance of the flexible part, that is the rubber stopper, against movement until a leak occurs. In particular, it would be beneficial to have a possibility to assess whether a rubber stopper which has been extracted from its initial sealing position by a predetermined threshold distance, herein also called predetermined threshold travel or predetermined threshold value, still prevents leakage. There was a need for testing CCI of a connection between a rubber stopper and a corresponding drug container and for examining the quality of a combination of a rubber stopper and a corresponding drug container.

The present invention provides means for CCI testing in form of a device and a method for leakage testing of a connection between a rubber stopper and a corresponding drug container. It is a further object of the present invention to provide the possibility of examining the quality of a combination of a drug container and a rubber stopper.

The above objects are solved by a device for leakage testing of a connection between a rubber stopper and a corresponding drug container comprising the features according to the device claims.

Furthermore, the above objects are solved by a method for leakage testing of a connection between a rubber stopper and a corresponding drug container, preferably a vial or a cartridge, comprising the features according to the method claims.

SUMMARY OF THE INVENTION

Subject of the invention is a device (1) for leakage testing of a connection between a rubber stopper (2) and a corresponding drug container (3), wherein the device (1) comprises
- a displacement device (7) and
- a drug container receptacle (5), wherein
the drug container receptacle (5) is a receptacle for receiving at least part of the drug container (3), which has a dispensing opening (30) and a communication opening (31) for enabling fluid communication of the exterior of the drug container (3) with an interior (36) of the drug container (3) apart from its dispensing opening (30), when the rubber stopper (2) is inserted into the dispensing opening (30),
characterized in that
the displacement device (7) is a device for providing a displacement of the rubber stopper (2), which is inserted into the dispensing opening (30) of the drug container (3), relative to the drug container (3) in an opening direction (32), and
the displacement device (7) comprises a support member (70) for supporting the displacement device (7) against the drug container (3) and a movement member (71) for supporting the displacement device (7) against the rubber stopper (2), wherein the movement member (71) is movable relative to the support member (70) in the opening direction (32).

By providing a displacement device which consists of a support member and a movement member which are movable relative to each other, the distance by which the rubber stopper can be displaced relative to the drug container can be adjusted in a simple and reliable way. Thereby, the testing of leakage which can be carried out with the device according to the invention is reliable and can be carried out in a simple manner.

BRIEF DESCRIPTION OF THE DRAWINGS

The present disclosure will be more readily appreciated by reference to the following detailed description when being considered in connection with the accompanying drawings in which.

DETAILED DESCRIPTION OF PREFERRED EMBODIMENTS

Figure 1:
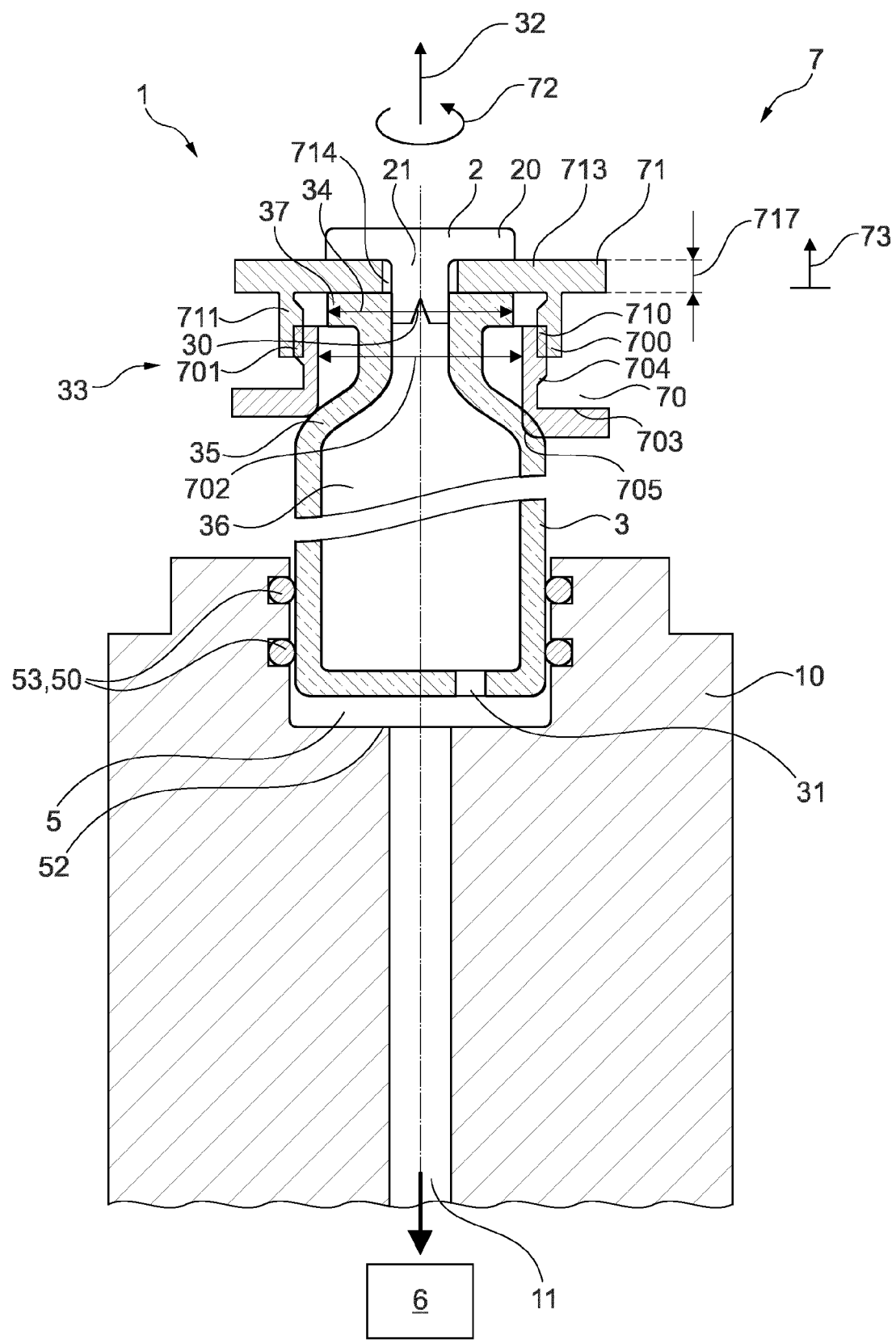
FIG. 1 is a schematic sectional view of a device for leakage testing of a connection between a rubber stopper and a corresponding drug container according to a first embodiment.

In the following, the invention will be explained in more detail with reference to the accompanying figures. In the figures, like elements are denoted by identical reference numerals and repeated description thereof may be omitted in order to avoid redundancies.

The drug container (3) has a dispensing opening (30) which during storage and transport of the drug container (3) is closed by a rubber stopper (2). The dispensing opening (30) is preferably formed in a neck portion (33) of the drug container (3). The rubber stopper (2) closes the dispensing opening (30) from the exterior, that means is introduced into the dispensing opening (30) from the exterior and preferably extends into the neck portion (33) of the drug container (3). Preferably, the drug container (3) is a drug container (3) which can be used for storing drugs under sterile conditions and which is closed by the rubber stopper.

The drug container (3) can be a vial or a cartridge, preferably it is a vial.

Preferably, the drug container (3) is a non-pressurized container.

In FIG. 1 a schematic sectional view of a device (1) and of the displacement device (7) for leakage testing of a connection between a rubber stopper (2) and a corresponding drug container (3) according to a first embodiment is shown.

Preferably, the support member (70) and the displacement member (71) comprise complementarily formed threads (700, 710) engaging with each other, which are configured such that a rotation of the movement member (71) relative to the support member (70) or vice versa results in a linear travel (73) of the movement member (71) relative to the support member (70) in the opening direction (32).

By means of the engaging threads (700, 710), when rotating the movement member (71) relative to the support member (70) or vice versa, the movement member (71) performs a helical movement predetermined by the configuration of the threads (700, 710), in particular by the lead of the threads (700, 710), as will be described in more detail below.

Preferably, the displacement device (7) is configured to be placed exteriorly onto a neck portion (33) of the drug container (3).

Preferably, the support member (70) contains a substantially circular ring section (701) comprising an inner diameter (702) greater than a maximum outer diameter (34) of the neck portion (33), wherein the thread (700) is arranged at the circular ring section (701).

Preferably, the support member (70) contains a support section (703) for resting on a shoulder (35) of the drug container (3).

So the inner diameter (702) is smaller the outer diameter of the vial, in order that the support section (703) can rest in the shoulder (35).

Preferably, the movement member (71) contains a collar section (713) for making contact with a collar (20) of the rubber stopper (2).

Preferably, the collar section (713) comprises a central hole (714) configured such that a cylindrical or truncated insertion section (21) of the rubber stopper (2) can reside therein.

So the diameter of the central hole (714) is smaller than the collar (20) of the rubber stopper (2).

The central hole (714) can also have a form different from a circular hole, as long as the collar (20) of the rubber stopper (2) remains supported on collar section (713).

Preferably, the central hole (714) comprises an inner diameter greater than a maximum outer diameter of the insertion portion (21) of the rubber stopper (2) and smaller than an outer diameter of the collar (20) of the rubber stopper (2), thereby there is a gap or a space between the collar section (713) and the insertion section (21) of the rubber stopper (2).

The dimension of the displacement device (7) and of its members are adapted and chosen according to the dimensions of the drug container (3) and the rubber stopper (2) corresponding to the drug container (3) as explained herein.

In case that the drug container (3) is a vial, typical dimensions of vials are known to the skilled person and are for example as stated in Table 10.

TABLE 10

| Size designation of vial | d1 [mm] | d2 [mm] |
|---|---|---|
| 2R | 16 | 13 |
| 6R | 22 | 20 |
| 20R | 30 | 20 | d1: outer Diameter of the body of the vial
d2: maximum diameter of the neck portion (33) of the vial Preferably, the movement member (71) contains a substantially circular ring section (711) comprising the thread (710).

Preferably, the movement member (71) comprises an internal thread (710) and the support member (70) comprises an external thread (700); or the movement member (71) comprises an external thread and the support member (70) comprises an internal thread. The first case is shown in FIG. 1. In the latter case, the circular ring section (701) may be arranged radially outwards with respect to the circular ring section (711) such that, again, the threads (700, 710) can engage with each other.

In principle, the lead of the threads (700, 710) can be chosen with respect to the size of the drug container (3) and its rubber stopper (2), so for example the larger the drug container (3) and the rubber stopper (2), the larger the lead may be chosen;

For example the larger the possible linear travel (73), which can be realized with respect to the dimensions of the rubber stopper (2) and the dispensing opening (30), the larger the lead may be chosen. Another criterion to choose the lead can be the predetermined threshold value to which the lead must correspond, for example the lead can be the predetermined threshold value or the lead can be a fraction of the predetermined threshold value.

Preferably the lead of the threads (700, 710) is in the range of from 0.01 mm to 10 mm, more preferably of from 0.1 mm to 8 mm, even more preferably of from 0.2 mm to 8 mm.

In one embodiment for rather smaller drug containers, the lead is preferably of from 0.1 mm to 5 mm, more preferably from 0.2 to 4 mm, even more preferably from 0.2 to 3 mm, especially from 0.2 to 2 mm.

In another embodiment for rather larger drug containers, the lead is preferably of from 0.5 mm to 10 mm, more preferably from 0.75 to 8 mm, even more preferably from 1 to 6 mm.

In a specific embodiment, the lead is 1 mm.

The "lead" is to be understood as the rise, that is as the linear travel (73) the movement member (71) makes per revolution about 360° relative to the support member (70).

Preferably, the communication opening (31) of the drug container (3) is in form of a hole or of a slot.

The communication opening (31) may be arranged at the bottom of the drug container (3); also the whole bottom of the drug container (3) can be cut off to provide said communication opening (31). This communication opening (31) is an artificial opening that was introduced into the drug container (3) only for the purpose of testing the container closure integrity.

In the exemplary embodiment displayed in FIG. 1, the drug container (3) is provided in form of a vial.

Preferably, the device (1) can further comprise a test medium supply (13) for exposing a connection region of the drug container (3) and the rubber stopper (2) to a test medium, this exposure can be done from the exterior or from the interior (36) of the drug container (3). This is exemplary shown in FIG. 3, The test medium may be but is not limited to a test gas, preferably the test gas is a rare gas such as helium or argon, or hydrogen, more preferably the test gas is helium.

Furthermore, the device (1) can comprise a detection unit (6) for detecting the presence of test medium that has passed through the dispensing opening (30) of the drug container (3) due to a leakage between the connection of the rubber stopper (2) and the drug container (3).

In this exemplary embodiment, the detection unit (6) is configured to detect test medium which has passed through the dispensing opening into the interior (36) of the drug container (3). Therefore, the detection unit (6) may be in fluid communication with the interior (36) via communication opening (31). The fluid communication may be preferably provided by a connection channel (11) extending in an optional main body (10) of the device (1) from the drug container receptacle (5) towards the detection unit (6).

Preferably, the detection unit (6) comprises a mass spectrometer.

Drug container receptacle (5) may optionally comprise one or more sealings (50) for sealing the connection channel (11) and/or a receptacle chamber (52) against the exterior of the device (1) when the drug container (3) is correctly inserted into the drug container receptacle (5). Preferably, one or more guidings (53), preferably guide rings, are arranged in the drug container receptacle (5) for guiding the drug container (3) with respect to the receptacle (5). In a preferred embodiment, the sealings (50) may also provide guiding of the drug container (3), more preferably the sealings (50) may be identical with the guidings (53).

The one or more sealings (50) may divide the device and the drug container receptacle (5) into an upstream portion, which is above the one or more sealings (50) and into a downstream portion, which is below the sealings (50). Preferably, thereby, the receptacle chamber (52) of the drug container receptacle (5) being in fluid communication with the connection channel (11) may be formed by the lower or inner part of the receptacle (5), one of the one or more sealings (50) and the wall of the drug container (3).

Device (1) or displacement device (7) can comprise a travel determining unit. For determining and/or acquiring the linear travel (73) of the movement member (71) relative to the support member (70), The linear travel (73) of the movement member (71) relative to the support member (70) may be determined and/or acquired by means of detecting a cumulated angle of rotation of the movement member (71) relative to the support member (70). According to an exemplary embodiment, in this regard, the travel determining unit may comprise an encoder, preferably an absolute encoder.

In one embodiment of the invention, the interior (36) of the drug container (3) is filled with test medium.

In another embodiment of the invention, the exterior around the rubber stopper (2) and the movement member (71) comprises test medium. In this case the exterior around the rubber stopper (2) and the movement member (71) can be placed in the interior of a container or housing (9) which is filled with test medium.

Preferably, the surface of the collar section (713), which is in contact with the collar (20) of the rubber stopper (2), is structured in such a way that test medium can pass from the exterior around the rubber stopper (2) and the movement member (71) into the gap between the collar section (713) and the collar (20) of the rubber stopper (2).

Optionally, the support member (70) and/or the movement member (71) comprises a lateral opening (704), for injection of test medium from the exterior of the displacement device (7) into an interior region of the displacement device (7).

Preferably, the lateral opening (704) is in form of a hole.

Thereby, it may be ensured that any space between the neck portion (33) of the drug container (3) and displacement device (7) is also sufficiently filled with test medium. The test medium may be introduced through the lateral opening (704) for example by a syringe or a nozzle or a needle type injector (14) (see FIG. 7) or a nozzle directed towards or even being insertable, preferably being inserted, into the lateral opening (704) for introducing test medium through the lateral opening (704). Said syringe or nozzle or needle type injector may be comprised by device (1).

Furthermore, a positioning unit (15) (see FIG. 5 or 6) may optionally be provided in the drug container receptacle (5) for providing a stop position defining a maximum insertion depth of the drug container (3) into the drug container receptacle (5). Preferably, the positioning unit may be arranged to prevent closing of the connection channel (11) by the drug container (3) and/or the rubber stopper (2).

In some embodiments of the invention the one or more sealings (50), the one or more guidings (53), and/or a portion of an inner wall of the drug container receptacle (5) may be adapted to function as the positioning unit. Alternatively, the sealings (50), and/or the guidings (53) may be provided separate to positioning unit.

In some embodiments, the positioning unit (15) is a part which is removable from the device and can be placed on the drug container (3).

According to yet another embodiment, the one or more guidings (53) and/or the positioning unit may be part of the displacement device (7), wherein preferably, the displacement device comprises a guiding section forming the guiding and/or a positioning section forming the positioning unit, wherein preferably, the positioning section and/or the guiding section may be formed integrally with the displacement device, preferably with the support member (70) and/or the movement member (71).

In some embodiments, the sealing (50), the guiding and/or the positioning unit may comprise an O-Ring.

According to a further embodiment, the device (1) may comprise an adaptor which is compatible with a common leak detection system. In particular, the adaptor might be a flange or a ring.

Alternatively or in addition, the optionally provided sealing (50), guiding and/or positioning unit may be made of a flexible material, preferably a material selected from an elastomer, such as rubber, latex, or silicone.

In the following, a method for leakage testing of a connection between a rubber stopper (2) and a corresponding drug container (3) is disclosed with respect to FIG. 1.

Further subject of the invention is a method for leakage testing of a connection between a rubber stopper (2) and a corresponding drug container (3), wherein the method is carried out with a device (1) according to the invention.

Preferably, the method comprises the steps of:
a) providing a drug container (3) with a communication opening (31) for enabling fluid communication of an exterior of the drug container (3) with the interior (36) of the drug container (3) apart from its dispensing opening (30),
b) closing the dispensing opening (30) of the drug container (3) with the rubber stopper (2),
c) exposing either the exterior of the drug container (3) or, alternatively, the interior (36) of the drug container (3) at least at a connection region of the drug container (3) and the rubber stopper (2) inserted into the dispensing opening (30) of the drug container (3) to a test medium, and
d) displacing the rubber stopper (2) relative to the drug container (3) in an opening direction (32) for a chosen distance with the displacement device (7) while measuring any presence of the test medium either in the interior (36) or, alternatively, in the exterior of the drug container (3) that has passed through the dispensing opening (30).

The chosen distance can be any chosen distance m for example a predetermined threshold distance, or a distance until presence of the test medium either in the interior (36) or, alternatively, in the exterior of the drug container (3) passed through the dispensing opening (30) is detected.

The maximum possible chosen distance is defined by the geometry of the displacement device (7), that is by the maximum distance the movement member (71) may be rotated relative to the support member (70), or vice versa, until the threads (700, 710) disengage.

Preferably, the rubber stopper (2) is displaced relative to the drug container (3) by means of a displacement device (7), with the displacement device (7) as defined herein, also with all its embodiments.

Preferably, the displacement device (7) is placed exteriorly onto the neck portion (33) of the drug container (3) prior to closing the dispensing opening (30) with the rubber stopper (2).

After having placed the displacement device (7) exteriorly onto the neck portion (33) of the drug container (3) and after having closed the dispensing opening (30) with the rubber stopper (2), the movement member (71) may be rotated relative to the support member (70), or vice versa, thereby the rubber stopper (2) is displaced in the opening direction (32).

Figure 2:
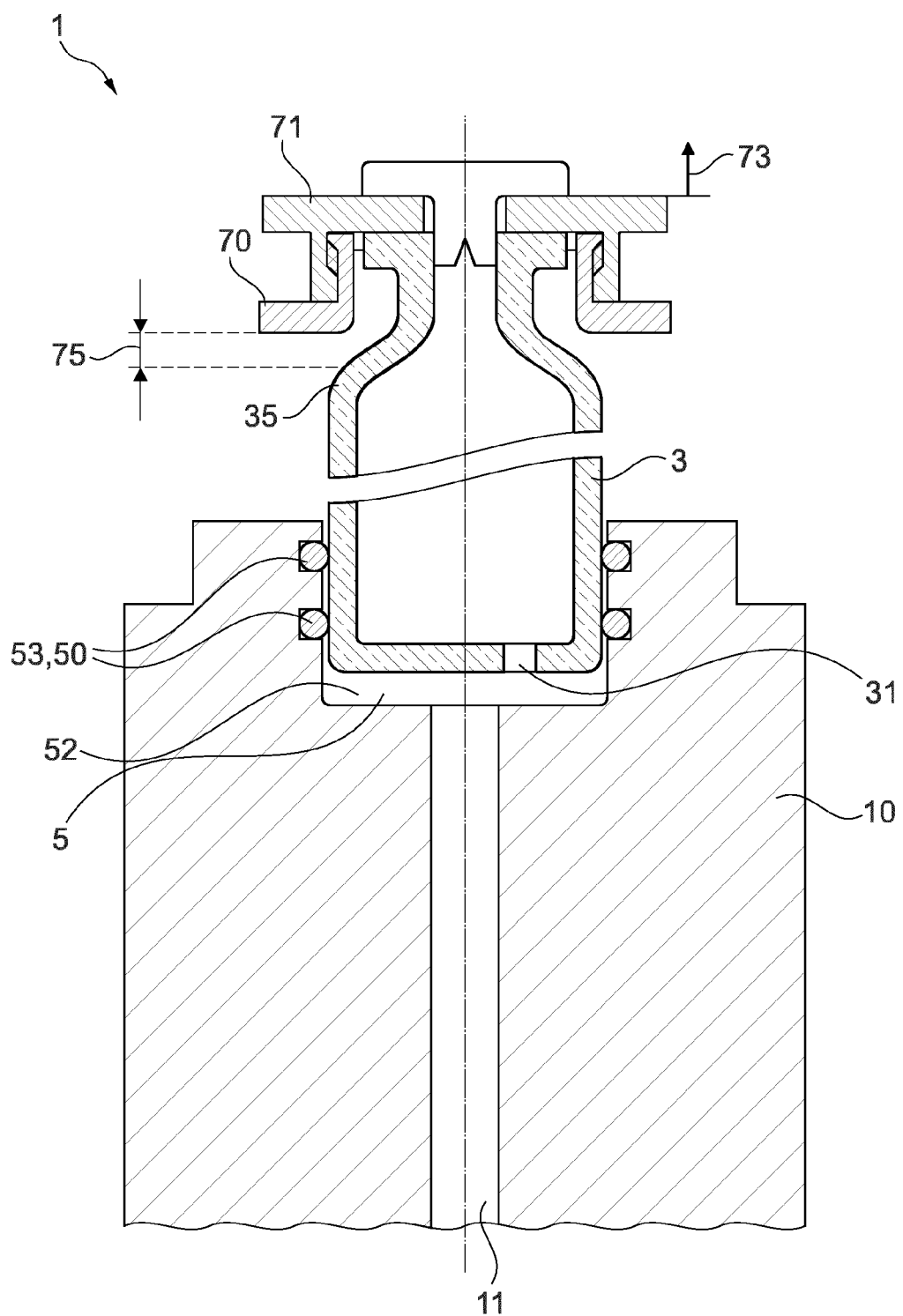
FIG. 2 is another schematic sectional view of the device of FIG. 1.

Preferably, the support member (70) and the movement member (71) are arranged in a screwed-in position relative to each other as shown in FIG. 2. This can be done either before or after placing the displacement device exteriorly onto the neck portion (33), but the displacement device (7) can as well be assembled from its the support member (70) and the movement member (71) on the neck portion (3). Hence, the movement member (71) rests on a collar (37) of the dispensing opening (30). Preferably, the movement member (71) and the support member (70) of device (7) are dimensioned in such a way that in the screwed-in position, the support member (70) is separated from the shoulder (35) of the drug container (3) by a distance (75) as shown in FIG. 2.

Subsequent to positioning of the displacement device (7) onto the neck portion (33) as described above, the dispensing opening (30) is closed with the rubber stopper (2) by insertion of the rubber stopper (2) into the dispensing opening (30) until the collar (20) of the rubber stopper (2) makes contact with the movement member (71). As the collar section (713) comprises a width (717), hence, the rubber stopper (2) is not completely inserted into the dispensing opening (30) and its collar (20) is spaced apart from the collar (37) of the drug container (3) by the width of the collar section (713) of the movement member (71).

The movement member (71) may then be rotated relative to the support member (70), or the vice versa, until the support member (70) makes contact with the shoulder (35) of the drug container (3). This position of the movement member (71) relative to the support member (70) may be determined as an initial position as shown in FIG. 1.

Now, exposure of the connection region of the drug container (3) and the rubber stopper (2) to the test medium and monitoring whether test medium passes through dispensing opening (30) may be started. Then, the movement member (71) may be rotated relative to the support member (70), or vice versa, preferably while detecting the cumulated angle of rotation of the movement member (71) relative to the support member (70), preferably starting from the initial position. With other words, the cumulated angle of rotation is set to zero at the beginning, preferably at the initial position, and the cumulated angle is a sum of the rotation the movement member (71) performs via its helical movement relative to the support member (70) or vice versa.

During the rotation of the movement member (71) against the support member (70) or vice versa, the ongoing monitoring for test medium that may pass through the dispensing opening (30) will reveal for example whether a leakage has occurred until the predetermined threshold distance has been reached, or, alternatively, the distance is determined until passing of the test medium through the dispensing opening (30) occurs.

Therefore the method may further comprise acquiring the linear travel (73) of the rubber stopper (2) or of the movement member (71), respectively, by means of detecting the cumulated angle of rotation in combination with the lead of the threads (700, 710).

Preferably the linear travel (73) of the movement member (71) starting from the initial position is acquired by multiplication of the detected cumulated angle of rotation by the lead of the threads (700, 710), the latter having the unit "travel per degree of rotation", preferably mm/360°. Hence, the helical movement may be divided in a rotational movement about an axis parallel to the opening direction (32), and a linear travel (73) parallel to the opening direction (32). It is also possible that said linear travel is be detected directly by a respective detecting device preferably being in communication with and/or integrated in the travel determining unit.

A predetermined threshold travel in the opening direction (32) of the rubber stopper (2) from a position in which the collar (20) makes contact with the collar (37) can be set for example by regulatory authorities that set standards for CCI.

The method of instant invention allows for testing the CCI in case of displacement of the rubber stopper (2) by a predetermined threshold travel equal or greater than width (717). As the linear travel (73) is defined herein as the travel distance of the rubber stopper (2) starting from the initial position, the width (717) can be added to the linear travel for comparison with the predetermined threshold travel.

Furthermore, a boundary travel may be determined as being the linear travel (73) having passed through the dispensing opening (30) is detected for the first time.

Preferably, the boundary travel is the linear travel (73) having passed through the dispensing opening (30) is detected for the first time plus the width (717).

Optionally, the boundary travel may then be compared to a predetermined threshold travel in order to determine whether the boundary travel is smaller, equal or greater than the predetermined threshold travel. Or optionally the linear travel (73) can also be stopped when the predetermined threshold travel is reached in case that no presence of the test medium has been detected having passed through the dispensing opening (30) until the predetermined threshold travel has been reached.

So the boundary travel shall be greater than the predetermined threshold travel for positive evaluation of the connection of the tested combination of drug container (3) and rubber stopper (2), that is for positive evaluation of CCI. For example, the predetermined threshold travel may have been set to 1 mm so the boundary travel shall be greater than 1 mm for positive evaluation of CCI. Since in the initial position, the collar (20) of the rubber stopper (2) is already spaced apart from the collar 37 by width (717) and the width (717) being for example 0.5 mm, and with an exemplary lead of 1 mm per 360° of rotation, hence, the movement member (71), or the support member (70) respectively, at least has to be rotated about 0.5 revolutions without detection of test medium for a positive result of CCI.

Hence, by detection of the angle of rotation as described above, a simple and precise detection of the linear travel (73) may be achieved.

Preferably, for the leakage testing of a connection between a rubber stopper (2) and a corresponding drug container (3), the drug container (3) is inserted into the drug container receptacle (5) of device (1), with device (1) as defined herein, also with all its embodiments.

Depending on the embodiment of device (1) and obviously on the embodiment of the method for leakage testing, the device (1) can be configured in such a way the drug container (3) is inserted into the drug container receptacle (5) in an upright position, that is with the bottom of the drug container (3) first, as displayed exemplary in FIG. 1. In this case preferably the exterior of the drug container (3) at least at a connection region of the drug container (3) and the rubber stopper (2) inserted into the dispensing opening (30) of the drug container (3) is exposed to test medium.

Figure 4:
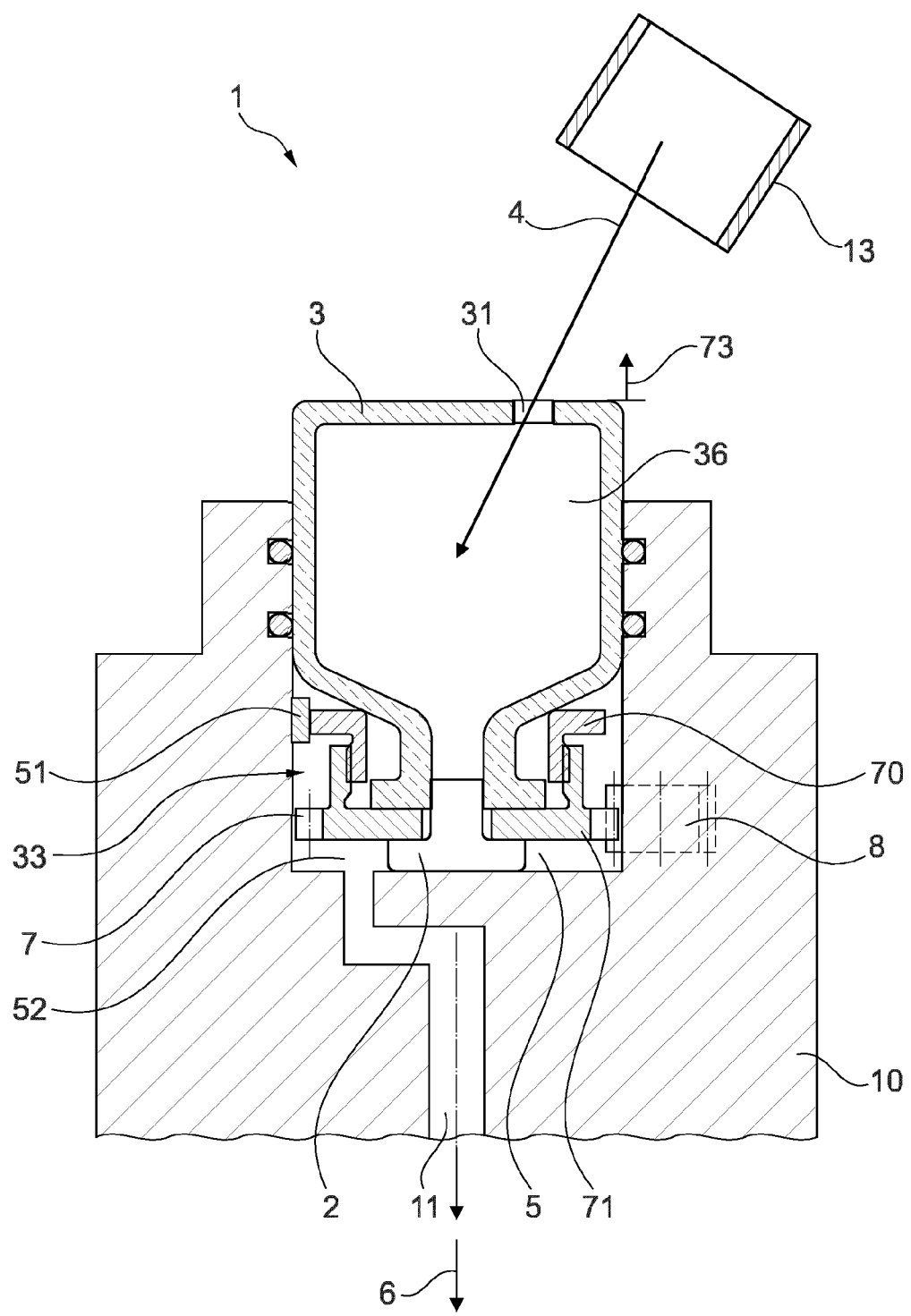
FIG. 4 is a schematic sectional view of a device for leakage testing of a connection between a rubber stopper and a corresponding drug container according to another embodiment.

In another embodiment of device (1) and obviously of the method for leakage testing, the device (1) can be configured in such a way the drug container (3) is inserted into the drug container receptacle (5) head on, that is with the neck portion first, as displayed exemplary in FIG. 4. In this case preferably the interior (36) of the drug container (3) at least at a connection region of the drug container (3) and the rubber stopper (2) inserted into the dispensing opening (30) of the drug container (3) is exposed to test medium, In both cases, whether the drug container (3) is inserted into the drug container receptacle (5) bottom first or head on, any test medium passing through the dispensing opening (30), that is in case of the leakage testing by way of a leakage between the rubber stopper (2) and the drug container (3), is passing preferably through the drug container receptacle (5), in particular through the receptacle chamber (52); preferably leaving the device (1) through the connection channel (11) and is preferably detected by the detection unit (6).

Figure 3:
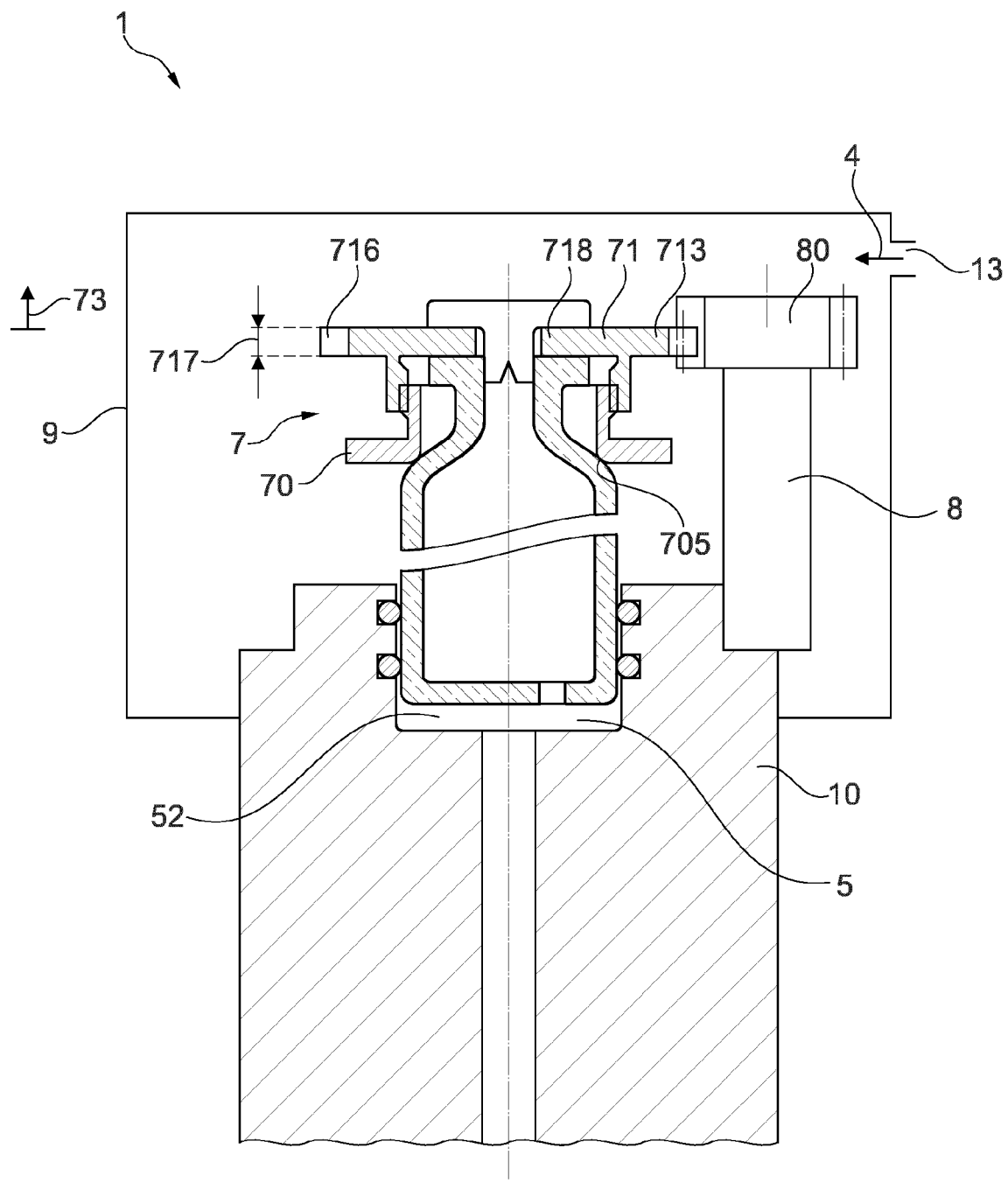
FIG. 3 is a schematic sectional view of a device for leakage testing of a connection between a rubber stopper and a corresponding drug container according to a further embodiment.

FIG. 3 is a schematic sectional view of a device (1) for leakage testing of a connection between a rubber stopper (2) and a corresponding drug container (3) according to a further embodiment. The device (1) substantially corresponds to the device (1) according to FIG. 1, wherein it preferably further comprises a preferably removable optional housing (9) which provides a chamber into which test medium indicated via reference sign (4) may be introduced from a test medium supply (13).

Preferably, the housing (9) comprises in addition an outlet (not shown) for pressure control inside the chamber provided by the housing (9).

Device (1) may comprise a movement unit (8) for moving the movement member (71) or the support member (70), respectively, in the moving direction (72).

The movement unit (8) may comprise a gear wheel (80) which is in engagement with a plurality of radially outwards extending teeth (716) distributed in a circumferential direction at the collar section (713) of the movement member (71) or the support section (703) of the support member (70), respectively.

Preferably, the plurality of radially outwards extending teeth (716) is distributed evenly in a circumferential direction at the collar section (713).

Preferably, the gear wheel (80) comprises a width greater than a maximum linear travel (73) of the movement member (71).

The movement unit (8) may comprise an actuator for moving the movement member (71) or the support member (70), respectively, in the moving direction (72).

Preferably, the actuator is an electric servomotor and/or a stepper motor.

The movement unit (8) may further comprise an encoder for detecting an angular position and/or the cumulated angle of rotation of the movement member (71), the support member (70) and/or the movement unit (8).

Preferably, the encoder is an absolute encoder.

FIG. 4 is a schematic sectional view of a device (1) for leakage testing of a connection between a rubber stopper and a corresponding drug container according to another embodiment. Here, the drug container (3) is inserted with its neck portion (33) into the drug container receptacle (5), with the neck portion (33) facing the connection channel (11). A displacement device (7) having a similar setup as described with regard to FIG. 1 is placed onto the neck portion (33) prior to insertion of the drug container (3) into the drug container receptacle (5).

Again, the movement member (71) is displaced relative to the support member by rotation of the movement member (71). As the rubber stopper (2) rests on the bottom of the drug container receptacle (5), by rotation of the movement member (71), the support member (70) and hence the drug container (3) is displaced relative to the rubber stopper (2), in FIG. 3 in an up-ward direction, resulting in a displacement of the rubber stopper (2) relative to the drug container in the opening direction (32).

The interior (36) of the drug container may be filled with test medium (4) through the communication opening (31).

Figure 5:
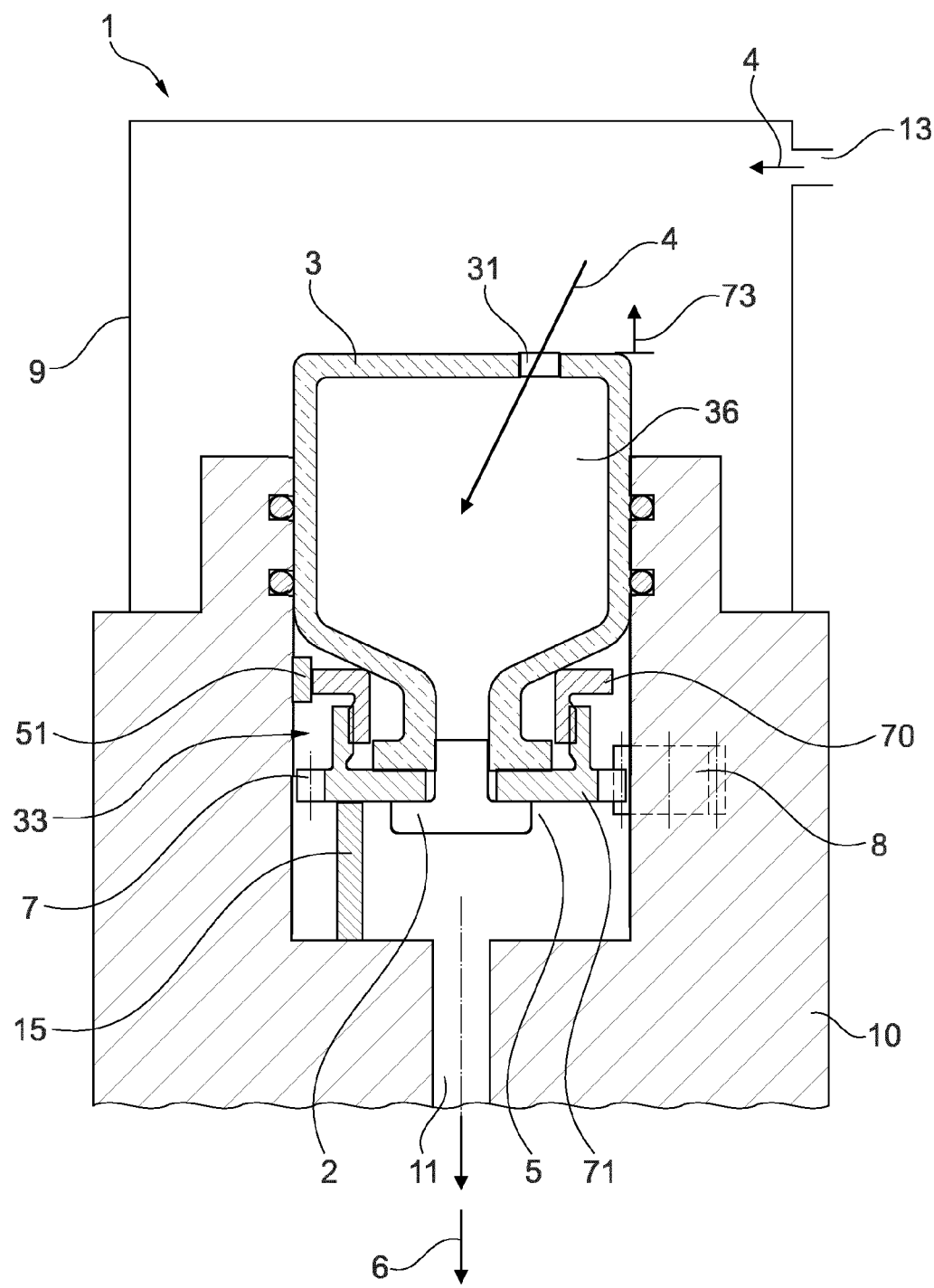
FIG. 5 is a schematic sectional view of a device for leakage testing of a connection between a rubber stopper and a corresponding drug container according to another embodiment.

The device (1) may comprise a test medium supply (13) and/or a housing (9) as displayed for example in FIGS. 3, 4 and 5.

When leakage at the connection of dispensing opening (30) and rubber stopper (2) occurs, test medium can flow from the interior (36) of drug container (3) to the connection channel (11) and further on to the detection unit (6).

Device (1) can comprise a linear guide (51) which engages with the support member (70) or alternatively with the movement member (71), for restricting or even preventing a rotary movement of the support member (70) or alternatively the movement member (71). The first alternative is shown in FIG. 4.

As shown in e.g. in FIG. 3, when the movement member (71) shall rotate relative to the drug container (3) and to the rubber stopper (2) and the support member (70) shall not rotate relative to the drug container (3), then optionally the movement member (71) may contain a contact area (718) comprising a material having a low coefficient of friction against the rubber stopper (2), preferably equal to or smaller than 0.3, more preferably equal to or smaller than 0.25, even more preferably equal to or smaller than 0.15 against the rubber stopper (2).

Preferably, the contact area (718) is of a material such as POM, PET, PVDF, or PEEK.

The contact area (718) may be provided in the form of a coating, and/or in the form of a separate part, for instance a sliding ring.

This contact area should facilitate the rotation of the movement member (71) relative to the rubber stopper (2).

As shown in e.g. in FIG. 1 or FIG. 3, when the movement member (71) shall rotates relative to the drug container (3) and to the rubber stopper (2) and the support member (70) shall not rotate relative to the drug container, then optionally the support member (70) may contain a contact area (705) comprising a material having a high coefficient of friction against glass, preferably equal or greater than 0.4, more preferably equal or greater than 0.5, even more preferably equal or greater than 0.6 against glass.

When rotating the movement member (71) relative to the support member (70), the contact area (705) due to a sufficiently high friction between the support member (70) and the drug container (3), contributes to substantially avoiding or minimizing a movement, e.g. a slipping, of the support member (70) relative to the drug container (3).

When the movement member (71) rotates relative to the drug container (3) and to the rubber stopper (2) and the support member (70) does not rotate relative to the drug container (3), then optionally, device (1) can comprise a part that by interaction with the support member (70) prevents a rotation of support member (70), such as linear guide (51) described above with respect to FIG. 4.

Obviously, when the movement member (71) shall not rotate relative to the drug container (3) and to the rubber stopper (2) and the support member (70) shall rotate relative to the drug container (3), then the situation with regard to the coefficient of friction of the optional contact areas (718) and (705) is inverted, and the optional part of device (1) that shall prevent rotation shall prevent rotation of the movement member (71).

FIG. 5 is a schematic sectional view of a device (1) for leakage testing of a connection between a rubber stopper (2) and a corresponding drug container (3) according to another embodiment. The device (1) substantially is equal to the device shown in FIG. 4, wherein a housing (9) covers the top of the main body (10) thereby providing a sealed space inside the housing (9), into which test medium (4) is inserted via the test medium supply (13) similar to the embodiment according to FIG. 3.

In addition, an optional positioning unit (15) is arranged in the drug container receptacle (5) for providing a stop position defining a maximum insertion depth of the drug container (3) into the drug container receptacle (5). Thereby, the positioning unit (15) prevents closing of the connection channel (11) by the rubber stopper (2). The position unit (15) may further be provided as described herein, especially with regard to device (1).

An according device (1) can be taken from PCT/EP2018/074731 with filing date 13 Sep. 2018, which is incorporated herewith by reference in its entirety.

Figure 6:
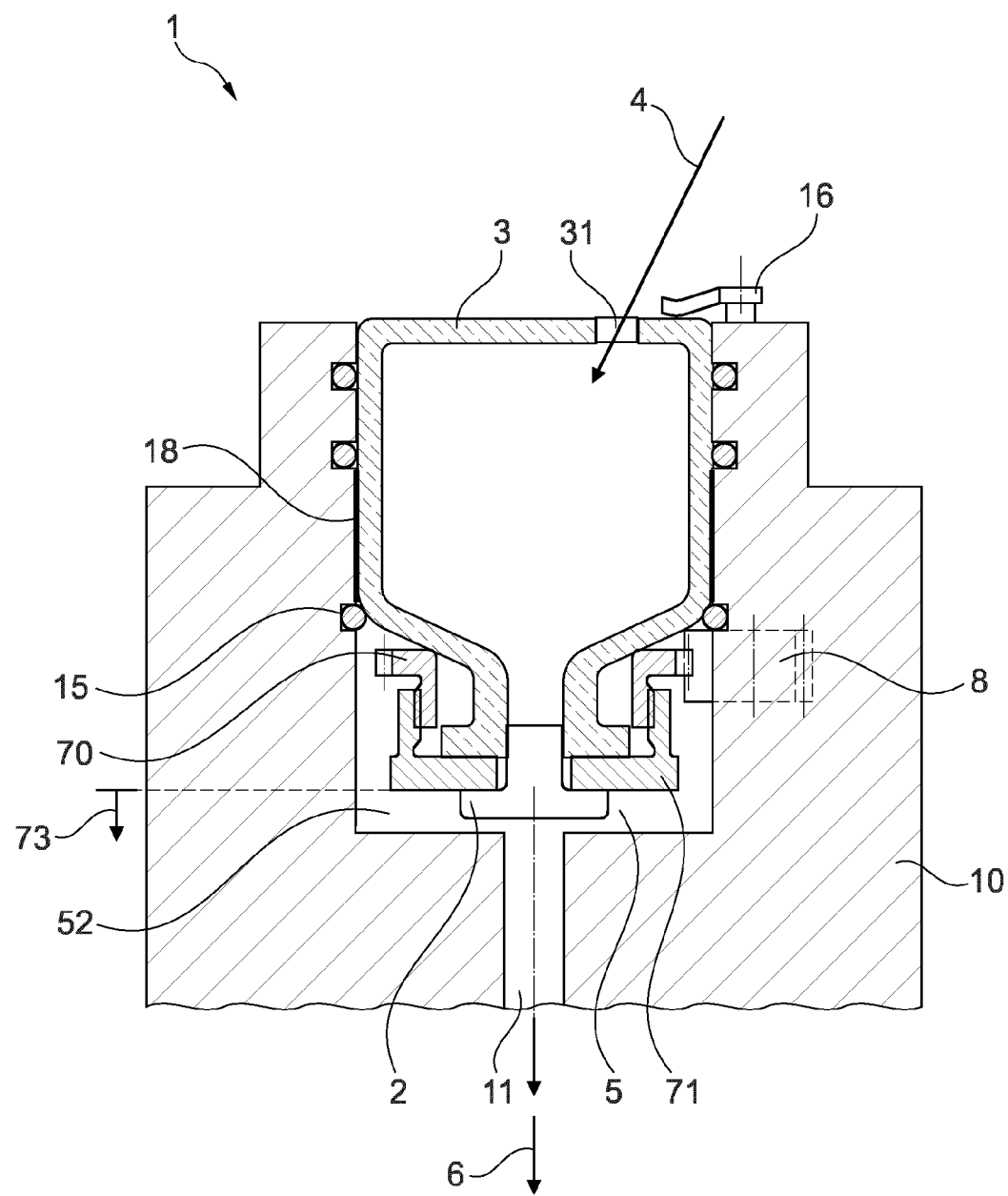
FIG. 6 is a schematic sectional view of a device for leakage testing of a connection between a rubber stopper and a corresponding drug container according to yet another embodiment.

FIG. 6 is a schematic sectional view of a device (1) for leakage testing of a connection between a rubber stopper (2) and a corresponding drug container (3) according to yet another embodiment. The device substantially corresponds to the device shown in FIG. 5, wherein here, the support member (70) meshed with the movement unit (8).

Moreover, the device (1) optionally comprises a positioning unit (15) arranged in a recess in the inner wall of the drug container receptacle (5) which provides a stop for the drug container (3). By the positioning unit (15), in this exemplary embodiment provided in the form of a stopping ring, preferably an O-Ring, a maximum insertion depth of the drug container (3) is predetermined.

The positioning unit (15) may circumferentially enclose the neck of the container and/or sits on the shoulder of the container.

Moreover, the device (1) may comprise an optional down-holding unit (16) which may exert a force onto the drug container (3) in direction of the positioning unit (15), preferably by means of biasing the down-holding unit (16). Thereby, the drug container (3) may be held in position with respect to the main body (10). Preferably, the drug container (3) is fixed in its position with regard to the main body (10) by means of the positioning unit (15) and the down-holding unit (16).

Preferably, the positioning unit (15), preferably in combination with the down-holding unit (16), prevents a repositioning of the container (3) even when a pressure difference is applied.

Thus, in this exemplary embodiment, the rubber stopper (2) is moved downwards towards the connection channel (11) (cf. orientation of linear travel (73)) when the support member (70) is turned by the movement unit (8).

Alternatively, the lower one of the sealings (50) (see e.g. FIG. 1) may be adapted to act simultaneously as positioning means (4). With other words, the positioning means may also be adapted to provide sealing between the inner wall of the drug container receptacle (5) and the drug container (3) at the contact region between drug container and positioning unit (15). That is, at least one of preferably all of the sealings (50) in FIG. 5 may be omitted.

Figure 7:
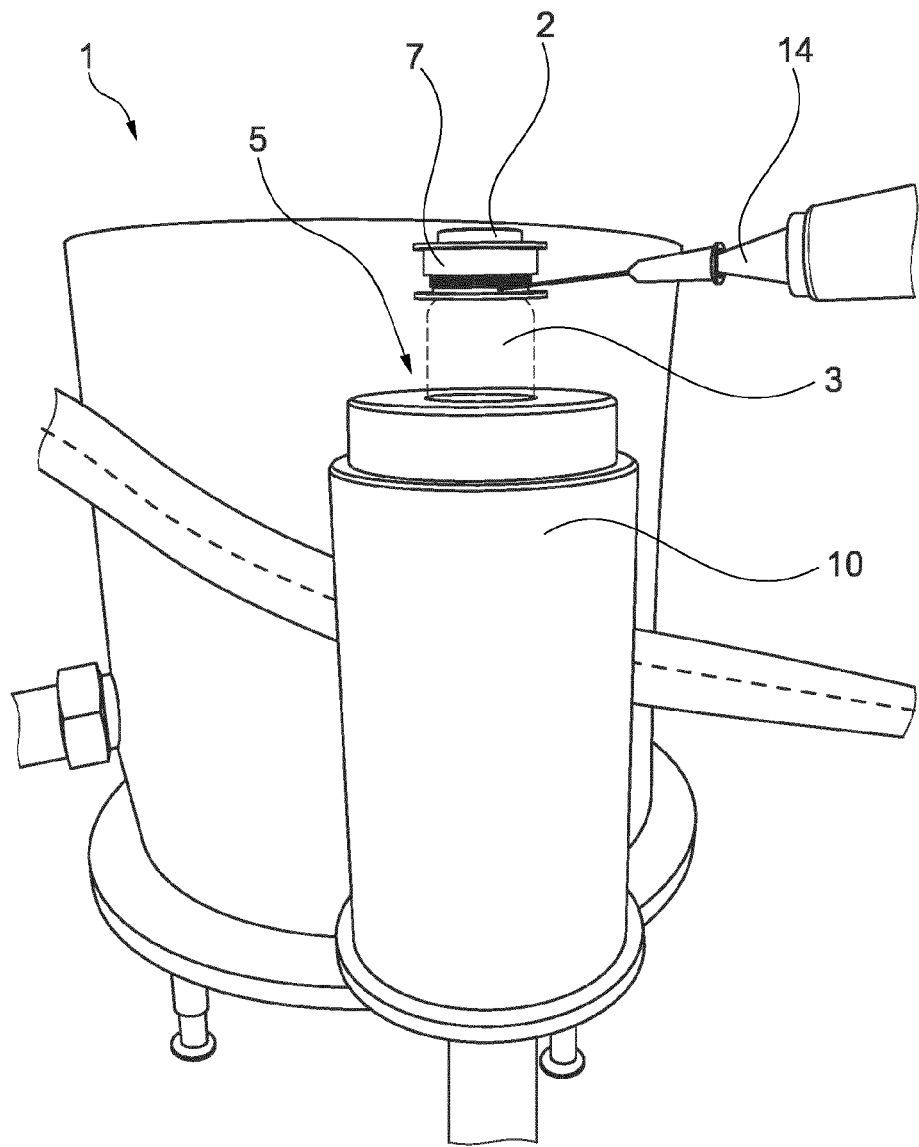
FIG. 7 is a perspective side view of another embodiment of a device for leakage testing of a connection between a rubber stopper and a corresponding drug container.

FIG. 7 is a perspective side view of another embodiment of a device (1) for leakage testing of a connection between a rubber stopper (2) and a corresponding drug container (3) carrying a displacement device (7). The device (1) substantially corresponds to the device of FIG. 1. In this view, the optional syringe or nozzle or needle type injector (14) is shown.

Figure 8:
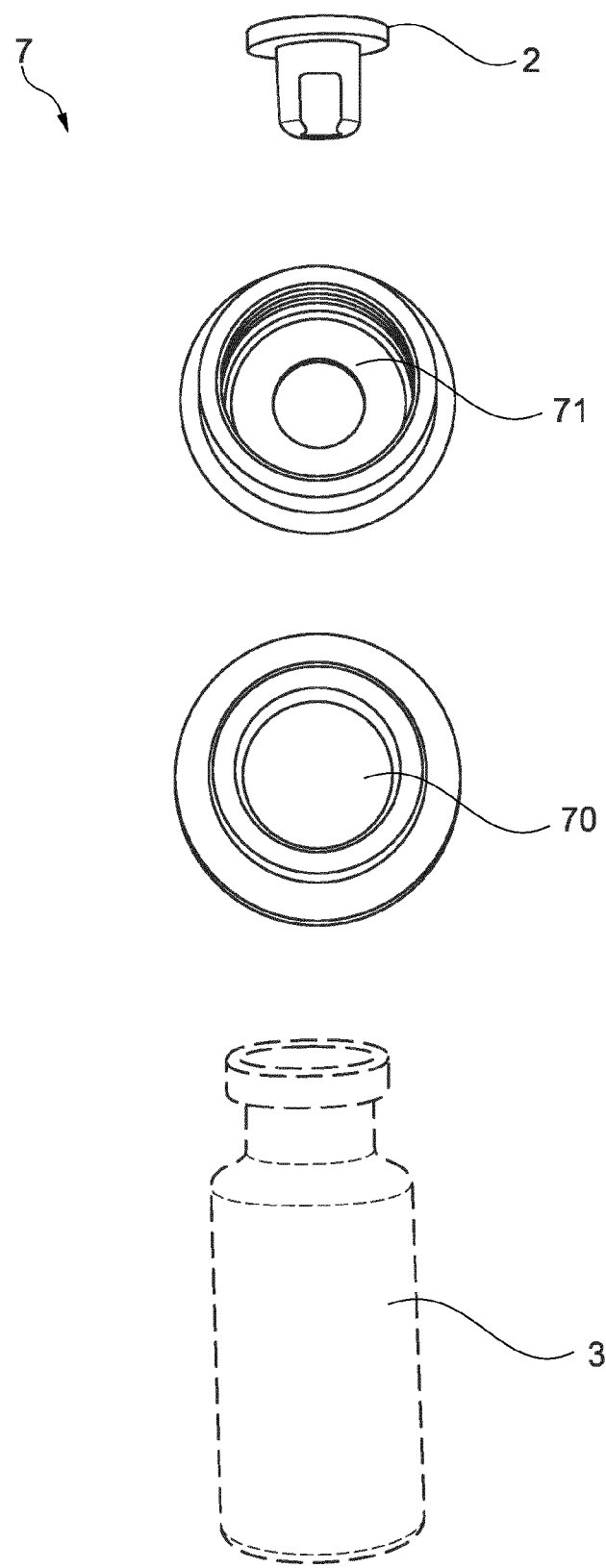
FIG. 8 shows a detailed view of several parts of the device of FIG. 7 wherein the support member and the movement member of the displacement device are separated.

FIG. 8 shows a detailed view on several parts of the device of FIG. 7, namely the rubber stopper (2), the displacement device (7), wherein the support member (70) and the movement member (71) are separated from each other, and a drug container (3) for being tested.

Figure 9:
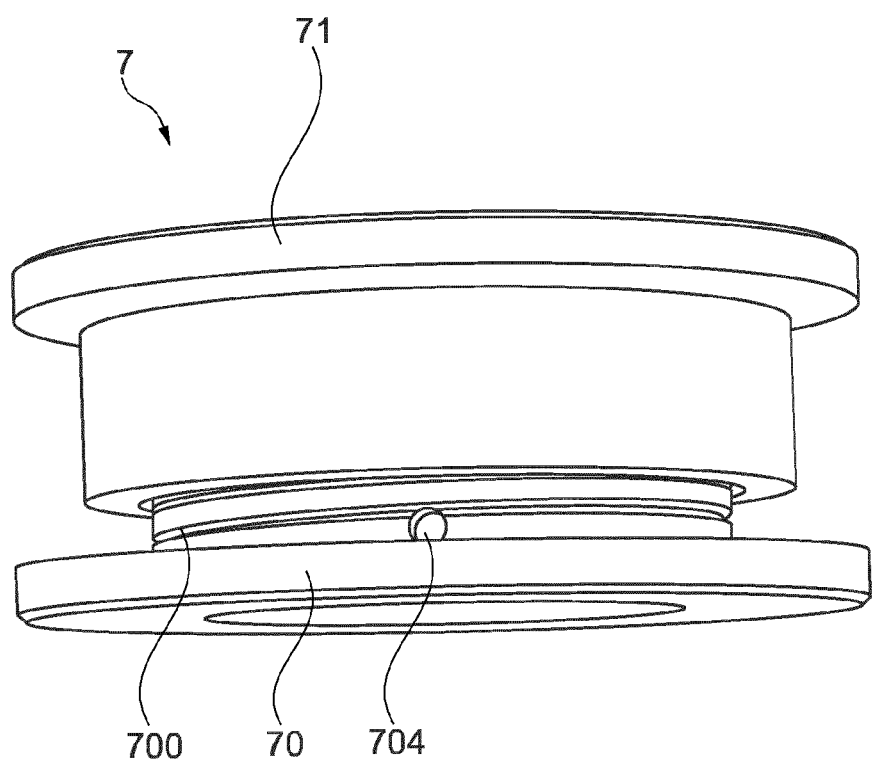
FIG. 9 is a side view of a displacement device of the device of FIG. 7.

FIG. 9 shows a side view of the displacement device (7) of FIG. 7 in an assembled state. This figure furthermore provides a clear view on the thread (700) and the lateral opening (704) of support member (70).

Figure 10:
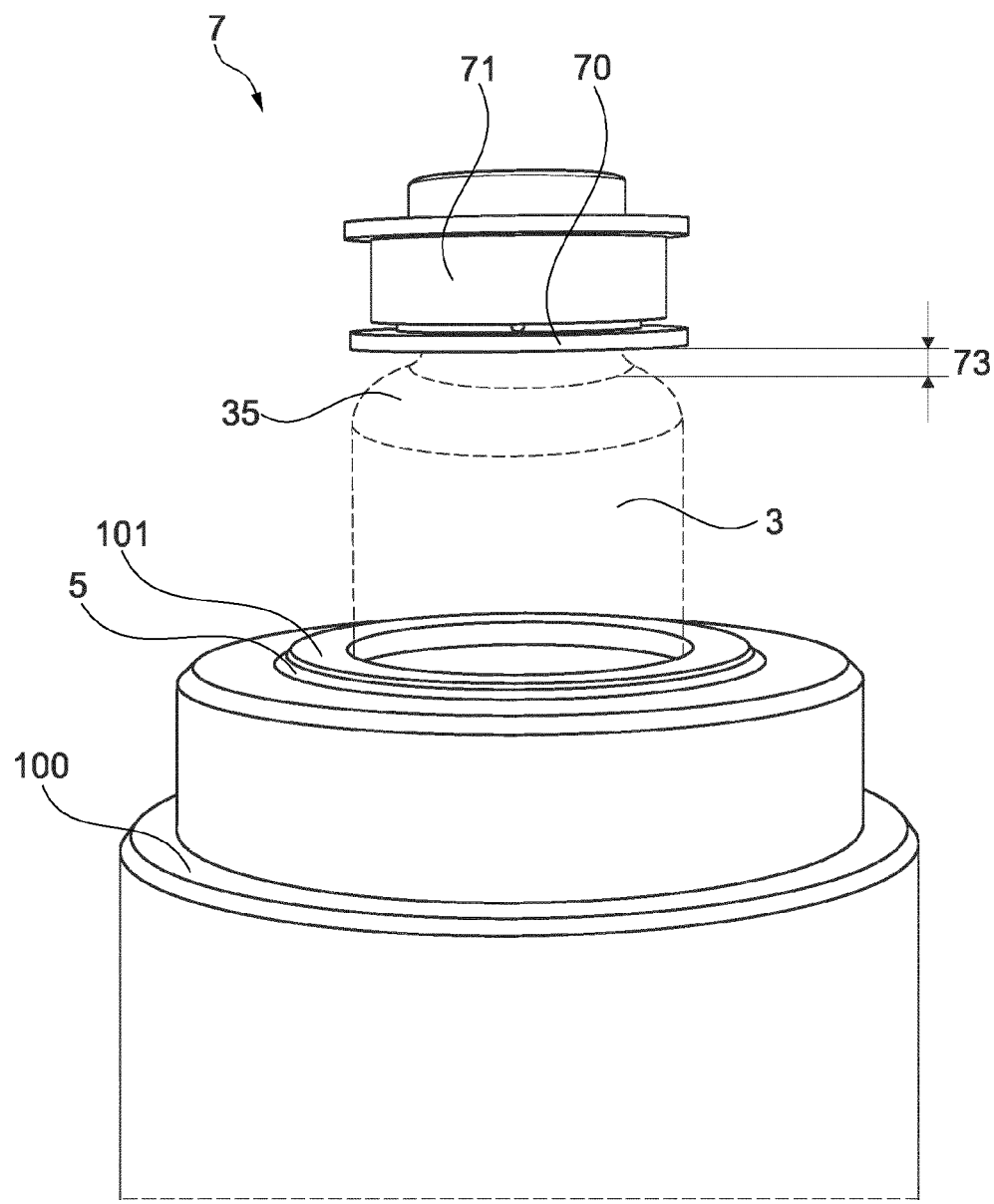
FIG. 10 is another side view of the device of FIG. 7, wherein the support member and the movement member of the displacement device are in a screwed-in position.

FIG. 10 is a side view of the device (1), the drug container (3) and the displacement device (7) of FIG. 7, wherein the support member (70) and the movement member (71) of the displacement device (7) are in the screwed-in position. Hence, as explained above with regard to FIG. 2, the support member (70) is separated from the shoulder (35) of the drug container (3) by distance (75).

In addition, FIG. 10 shows an embodiment of the main body (10) of the device, wherein on the outer circumference a step (100) is formed in the upper part of the main body (10). In particular, the outer diameter of the main body (10) is smaller in the upper part. One usage of this step (100) will be described later with reference to FIGS. 31 and 32. In addition, in the embodiment of FIG. 10 an adapter cylinder (101) is inserted into the drug container receptacle (5). This embodiment will be described in more detail with reference to FIG. 30.

Figure 11:
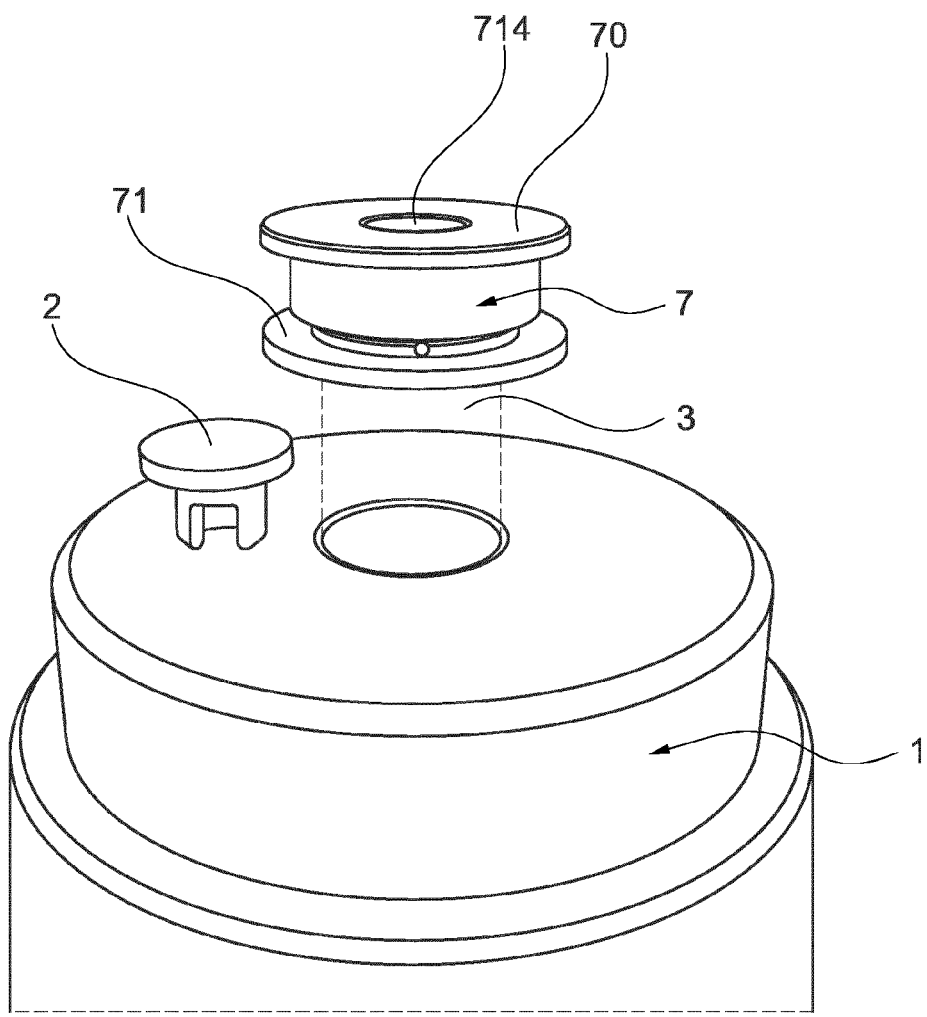
FIG. 11 is another side view of the device of FIG. 7, wherein the support member and the movement member of the displacement device are in an initial position.

FIG. 11 is a side view of the device (1), the drug container (3) and the displacement device (7) of FIG. 7, wherein the support member (70) and the movement member (71) of the displacement device (7) are in the initial position as described above with regard to FIG. 1. Hence, the support member (70) is in contact with the shoulder (35). The rubber stopper (2) has not been inserted yet into the central hole (714) and hence into the dispensing opening (30) of the drug container (3).

Figure 12:
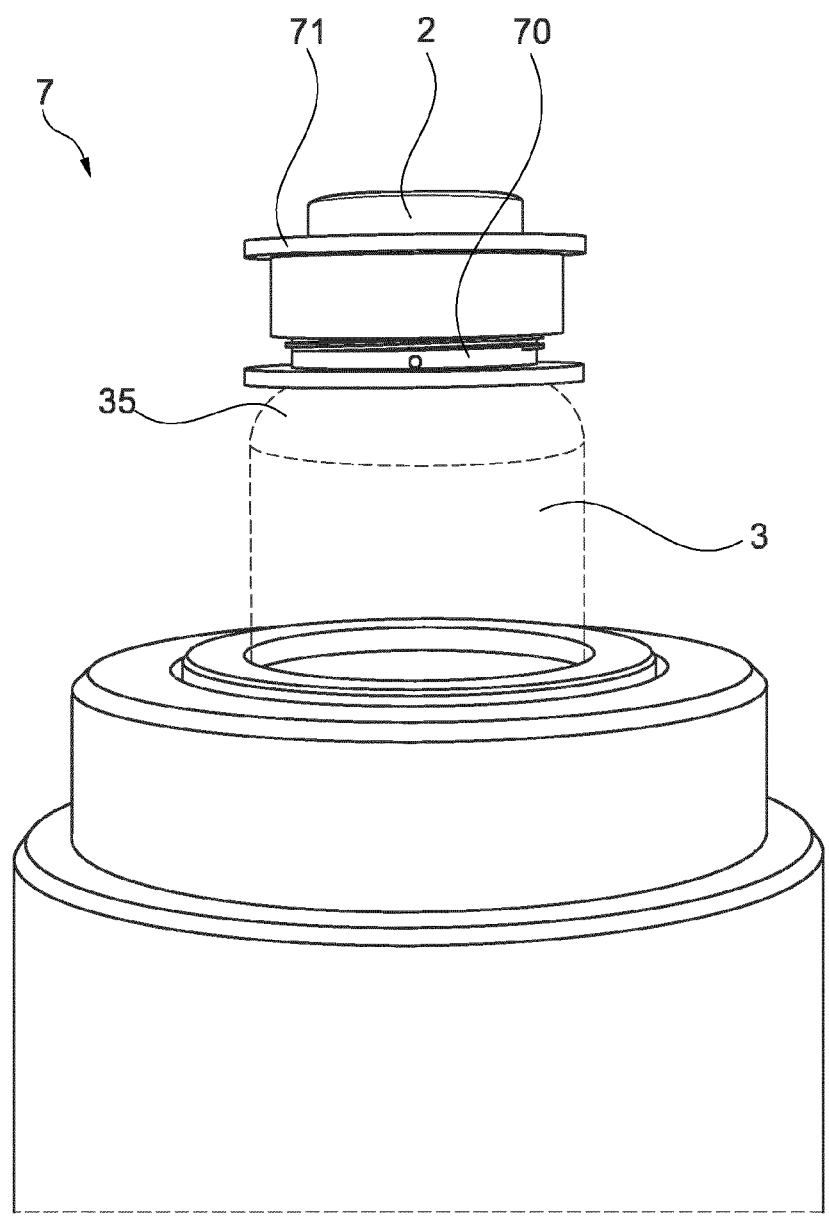
FIG. 12 is another side view of the device of FIG. 7, wherein the support member and the movement member of the displacement device are in an initial position and a rubber stopper is inserted into the drug container.

FIG. 12 shows another side view of the device according to FIG. 11, wherein the rubber stopper (2) is inserted into the central hole (714) and hence the dispensing opening (30) until the collar (20) is in contact with the upper surface of movement member (71) according to FIG. 1. That is, the movement member (71) and the rubber stopper (2) are in the initial position and, hence, the rubber stopper (2) has not yet been raised by the movement member (71).

Figure 13:
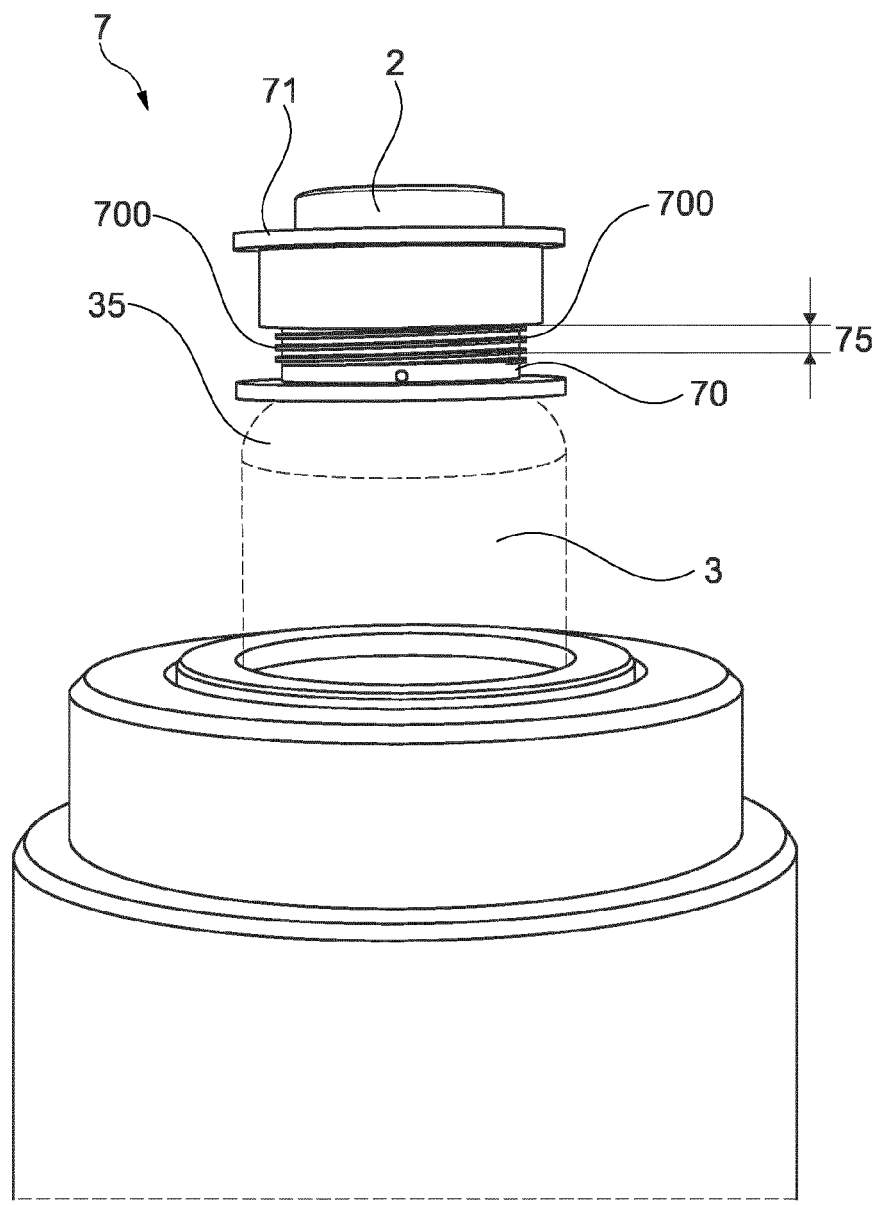
FIG. 13 is another side view of the device of FIG. 7, wherein the support member and the movement member of the displacement device are in position in which leakage of the connection between the rubber stopper and the drug container has been detected.

FIG. 13 is a side view of the device (1), the drug container (3) and the displacement device (7) of FIG. 7, wherein the support member (70) and the movement member (71) of the displacement device (7) are in a position in which leakage of the connection between the rubber stopper (2) and the drug container (3) has been detected. Thus, the movement member (71) has been rotated relative to the support member (70) such that the movement member (71) and hence the rubber stopper (2) have been displaced relative to the initial position shown in FIG. 12 about a linear travel (73).

Figure 14:
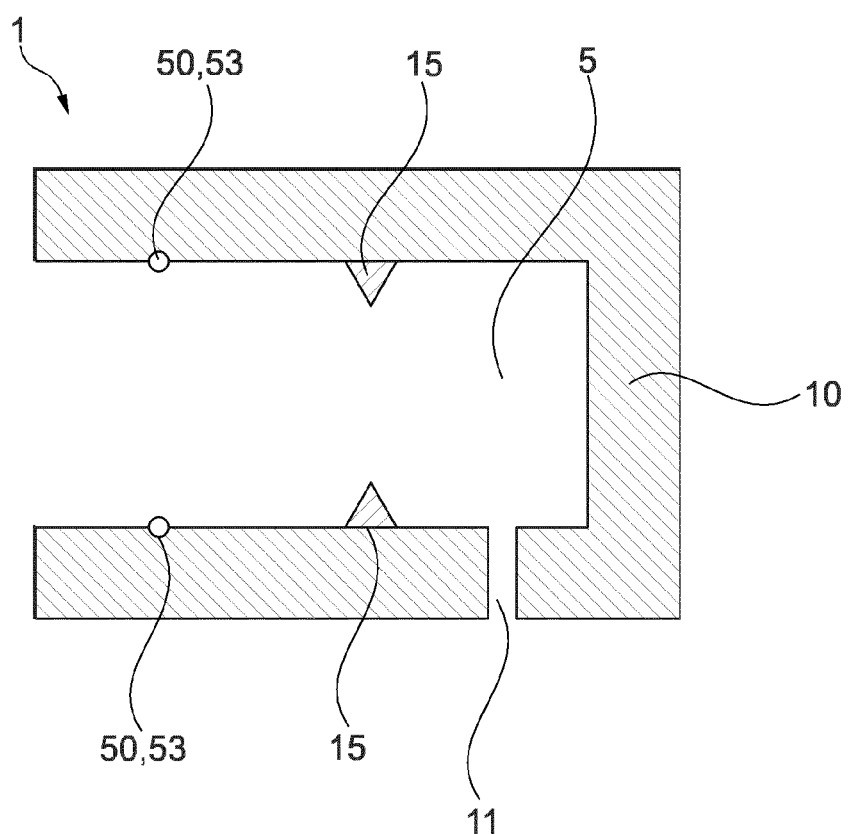
FIG. 14 schematically shows another exemplary embodiment of a device for leakage testing of a connection between a rubber stopper and a corresponding drug container.
Figure 15:
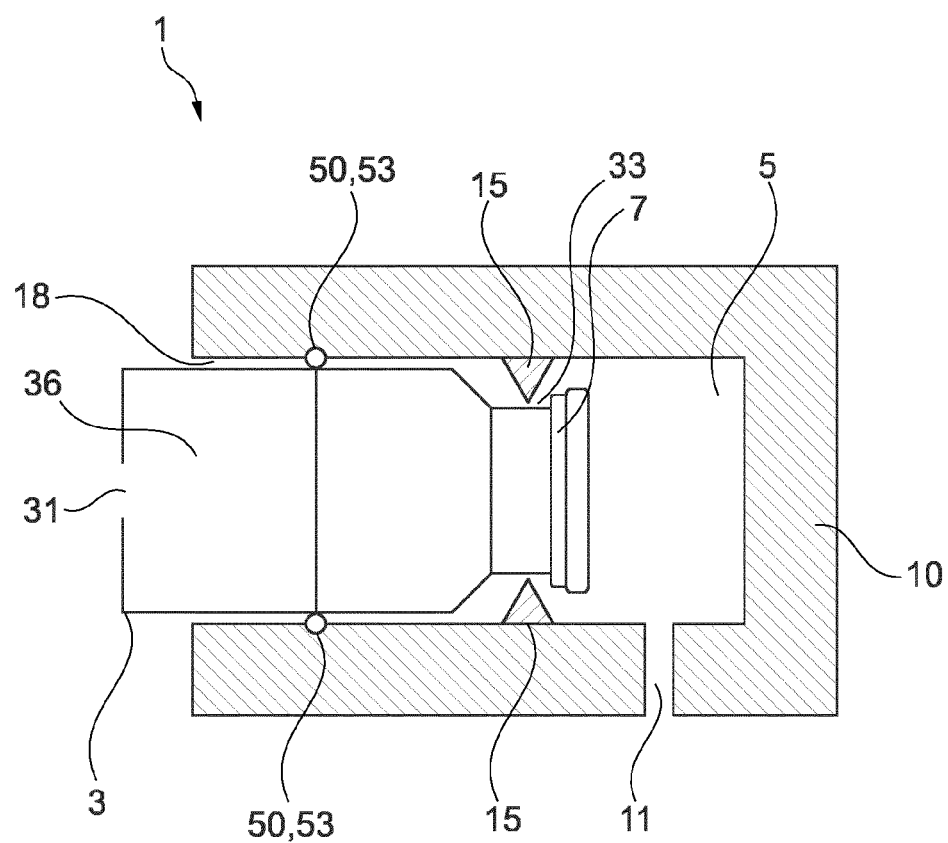
FIG. 15 shows the device of FIG. 14 having a drug container inserted in its drug container receptacle.

FIGS. 14 and 15 schematically show a device (1), which comprises integrated measures to act as positioning unit (15). In this case, the positioning unit (15) could be a protrusion, preferably a rim on the inside of the inner wall of the drug container receptacle (5).

Figure 16:
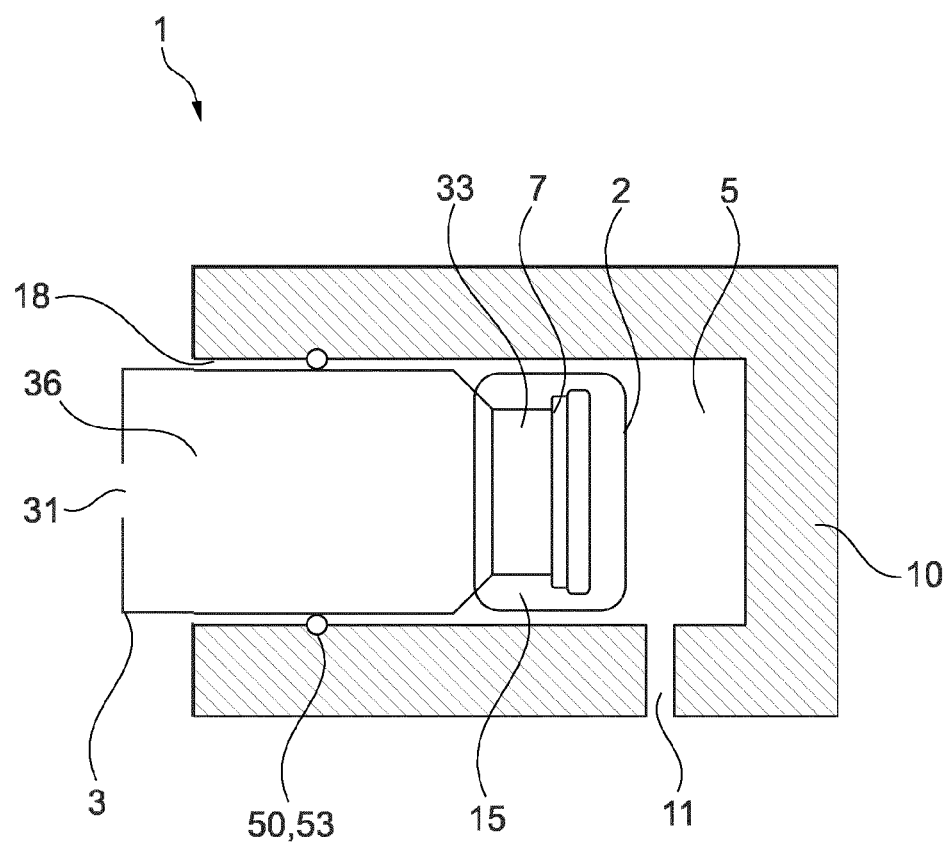
FIG. 16 schematically shows another exemplary embodiment of a device for leakage testing of a connection between a rubber stopper and a corresponding drug container.

FIG. 16 schematically shows a device (1), wherein the positioning unit (15) is provided separate from the main body (10), for example in form of a ring, which can be placed over the container (3). Preferably, in this regard, the positioning unit (15) is formed as a part of the displacement device 3.

The positioning unit (15) may be of the same or a different material than the sealing (50). In one embodiment of the invention, the positioning unit is made of the same material as the sealing. In another preferred embodiment, said material is a flexible material, such as an elastomer, for example selected from rubber, latex, or silicone. In a further embodiment, the positioning unit is made from a rigid material, such as plastic, metal, or a rigid composite material.

Alternatively, the positioning (15) unit may be made of the same or different material as the wall of the drug container receptacle (5). If the positioning unit is integral to the drug container receptacle (5), it is preferred that it is made of the same material as the drug container receptacle (5) and/or the main body (10).

The housing (9) and/or the main body (10) might comprise any suitable material. Particularly suitable materials include, but are not limited to metals, metal alloys or plastic, more preferably steel, aluminum or plastic. The device (1) may be adapted and/or sized for one specific type of drug container (3) defined by its dimensions. Alternatively, the positioning unit (15) and/or sealing (50) and/or the guidings (53) may be exchangeable to allow adaptation of the device (1) to different sizes or shapes of drug containers. If the device (1) is adaptable to different sizes of containers or to different container shapes, it is preferred that the exchangeable sealing (50) and/or positioning unit (15) and/or the guidings (53) are made of the same material. Preferably, in this case positioning unit (15) is adapted to also function as sealing.

It is important that the drug container receptacle (5), the main body (10) and/or the housing (9) are configured to withstand a pressure difference between the sealed inside and the external environment when the testing conditions are applied.

In another preferred embodiment, the device (1) and/or the displacement device (7) comprises means to be connected to a computing device.

In a particular embodiment of the invention, the device (1) according to the invention comprises or is connectable to means for temperature control, in particular cooling means and/or heating means.

The cooling and/or heating means can be realized in form of an own device separate from device (1), for example a device for cooling and/or heating, into which the device (1) is inserted for cooling and/or heating during the test; or the cooling and/or heating means can be comprised in device (1).

In a particular embodiment, the device (1) and/or the displacement device (7) is connectable to cooling means and the device (1) and/or the displacement device (7) and the cooling means are connectable to computing means. In a different preferred embodiment, the device (1) and/or the displacement device (7) additionally comprises cooling means and means to connect to a computing device.

In a preferred embodiment of the invention, the cooling means allow at least the cooling of the closure system, that is of the connection between the rubber stopper (2) and the drug container (3), constituent of dispensing opening (30) and rubber stopper (2), more preferably, the cooling means allows cooling of at least the drug container (3) comprising, even more preferably, the cooling means allow cooling of the chamber provided by the housing (9) and/or cooling of the drug container receptacle (5), and/or cooling of the main body (10).

In a preferred embodiment, the cooling means are adapted to provide sequential, preferably continuous cooling at least of the aforementioned parts.

Figure 17:
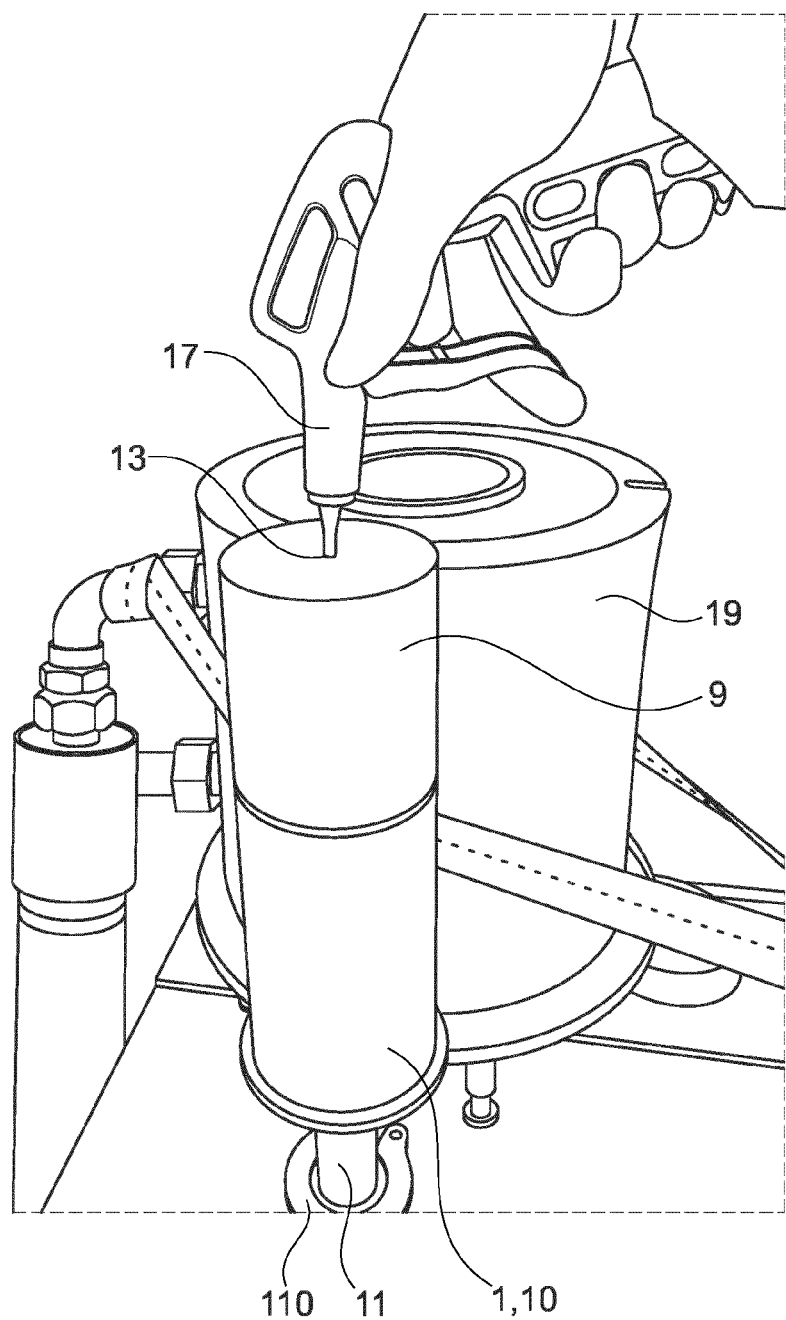
FIG. 17 is a photograph of an exemplary embodiment of a device for leakage testing of a connection between a rubber stopper and a corresponding drug container.

FIG. 17 shows an embodiment of device (1) with the housing (9), a hand held injector (17) for the supply of the test medium into the housing, device (1) with the connection channel (11) ending at the bottom of device (1) in form of a tube with a flange (110) and the cooling and/or heating means implemented as a tempering device (19) being in form of a separate device into which device (1) is inserted for cooling and/or heating during the test.

In a preferred embodiment the cooling means allow cooling to temperatures of at least −20° C. or lower, preferably at least −50° C. or lower, more preferably at least 80° C. or lower, particularly preferably 100° C. or lower, more particularly −196° C. (77 K) or lower.

The invention further relates to a computing system, configured to acquire any status of and/or to control the displacement device (7), and/or the device (1) and/or the means for temperature control, with the displacement device (7), and the device (1) and the means for temperature control as defined herein, also with all their embodiments.

The connection between a rubber stopper (2) and a corresponding drug container (3) to be tested may be any suitable connection. Non-limiting examples for a rubber stopper (2) comprise an elastomeric part which is responsible for the actual closing or sealing of the dispensing opening (30) of the drug container (3) which needs to be closed. Examples for the material of the elastomeric part are rubber or silicone. The form of the elastomeric part can be a plug or a lid. The connection between the dispensing opening (30) of the drug container (3) and the rubber stopper (2) can also comprise means for fixing the rubber stopper (2) to the dispensing opening (30) of the container (3), preferably by engaging between the rubber stopper (2) and the neck portion (33). An example for such means for fixing the rubber stopper (2) to the dispensing opening (30) of the drug container (3) are known to the skilled person under the term "blowback".

With respect to the exemplary device (1) shown e.g. in FIG. 3 or 5, a pressure difference between the interior (36) of the drug container (3) and the inside of the receptacle chamber (52) can for example be generated by evacuating the inside of the receptacle chamber (52), by applying pressure at the inside of the drug container (3), or by both measures, preferably by evacuating the inside of the receptacle chamber (52).

Furthermore, the method for leakage testing of a connection between a rubber stopper (2) and a corresponding drug container (3) may be a destructive or non-destructive method. In a non-destructive method, the drug container (3) may be filled with the testing gas before the drug container (3) is closed with the rubber stopper (2). In a destructive method, the container may comprise the communication opening (31).

Preferably, detection of the test medium passing through a leakage between the dispensing opening (30) and the rubber stopper (2) is done in form of a concentration, of a flow rate or of an amount, more preferably in form of a flow rate, of the test medium.

Preferably, the pressure inside the device (1), preferably in the preferably sealed receptacle chamber (52), may be set to equal to or less than 100 mbar, more preferably equal to or less than 50 mbar, even more preferably equal to or less than 25 mbar, especially equal to or less than 20 mbar, more especially equal to or less than 10 mbar, even more especially equal to or less than 5 mbar, in particular equal to or less than 1 mbar.

In a different embodiment of the invention, a pressure difference is generated, preferably by applying a vacuum to the inside of the device (1), that is in the receptacle chamber (52). Preferably, in such embodiments, the vacuum in the inside of the device (1) is continuously reduced, while the pressure of the test medium inside the drug container (3) is maintained constant.

In a preferred embodiment, the constant pressure is atmospheric pressure.

Preferably, the drug container (3) is filled with a test medium atmosphere, comprising at least 50%, even more preferably, at least 75%, especially at least 80%, more especially at least 85%, even more especially at least 90%, in particular at least 95%, of test medium, the % being % by volume based on the total volume of the atmosphere inside of the drug container (3).

Figure 29:
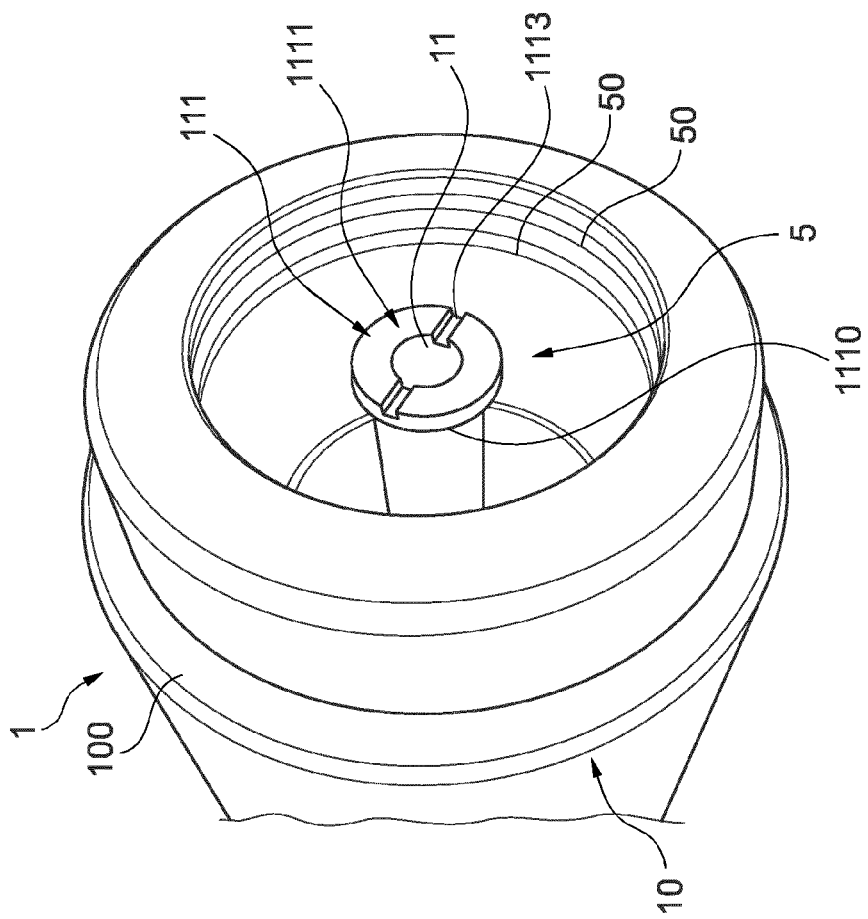
FIG. 29 shows a perspective top view of the embodiment of the device according to FIG. 28.
Figure 28:
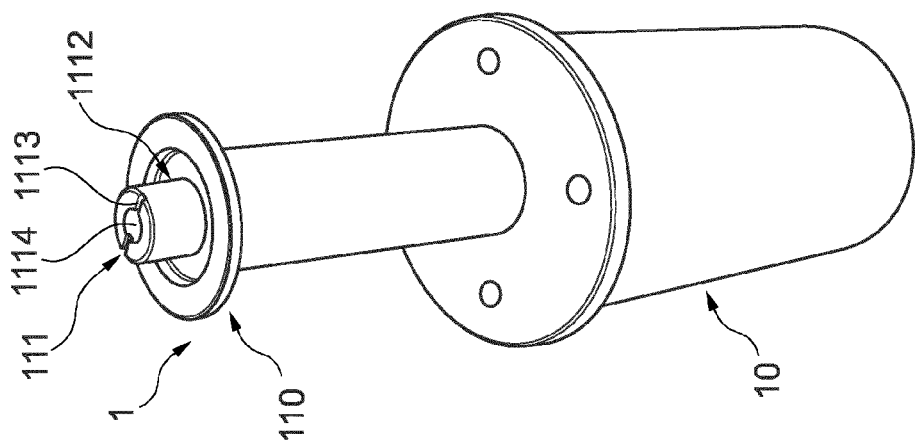
FIG. 28 shows a perspective bottom view of another embodiment of the device.

In FIGS. 28 and 29 an embodiment of the main body (10) of the device is shown, wherein the main body (10) comprises an ejector punch (111). The ejector punch (111) consists of a pipe (1110) with a head (1111) and a foot (1112). The outer diameter of the head (1111) and the foot (1112) are larger than the outer diameter of the pipe (1110). The pipe (1110) extends through the connection channel (not shown in FIGS. 28 and 29). The connection channel corresponds to the connection channel (11) as for example shown in FIGS. 1 and 2. The length of the ejector punch (111) is longer than the distance between the bottom of the drug container receptacle (5) (see FIG. 1) and the bottom of the flange (110). The ejector punch (111) is movably received in the connection channel. In a retracted state of the head (1111) of the ejector punch (111) rests on the bottom of the drug container receptacle (5), in particular on the bottom of the receptacle chamber (52). The diameter of the head (1111) is larger than the diameter of the connection channel. In FIG. 29 the position of the ejector punch (111) is shown in an extended state. In this extended state, the head (1111) of the ejector punch (111) is at a height in the receptacle chamber (52) which corresponds to the height of the sealing rings (50). By moving the ejector punch (111) from the retracted state to the extended state, a vial or other drug container (not shown), which was held in the drug container receptacle (5) and was sealed on its outer circumference be the sealing rings (50), can be pushed away from the bottom of the receptacle chamber 52. Thereby, removing the drug container (3) after testing is simplified.

As can be derived from FIGS. 28 and 29, according to one embodiment, the head (1111) and the foot (1112) of the ejector punch (111) have a slot (1113). The slot (1113) in the head (1111) is provided in the upper surface of the head (1111) and the slot (1113) at the foot (1112) is provided in the lower surface of the foot (1112). The slot (1113) extends over the diameter of the foot (1112) or the diameter of the head (1111), respectively. Thereby, fluid connection between the outer circumference of the head (1111) or foot (1113), respectively and the channel (1114) of the pipe (1110) can be ensured, even if the head (1111) or foot (1113) are in contact with other elements. For example, air can be drawn into the drug container receptacle (5) through the pipe (1110), when the drug container (3) which was received and sealed in drug container receptacle (5) by the sealing rings (50) is pushed out of the drug container receptacle (5). Due to the air tightness obtained by the sealing rings (50) moving the drug container (3) would not be possible without allowing air to enter the drug container receptacle (5).

With this embodiment of the device, where an ejector punch (111) is provided in the main body, the method according to the invention can comprise a step of pushing the ejector punch (111) from a retracted state to an extended state after the testing has been completed. Thereby, handling of the drug container (3) is facilitated.

Figure 30:
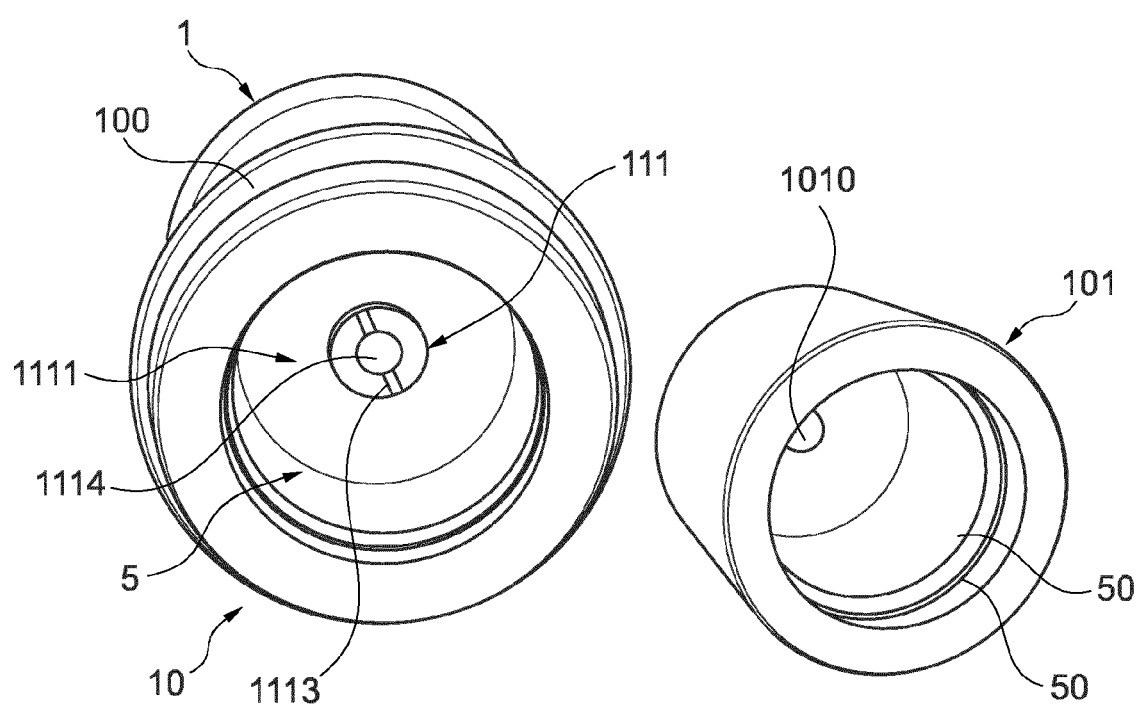
FIG. 30 shows a perspective top view of the device 1 according to FIG. 7.
Figure 31:
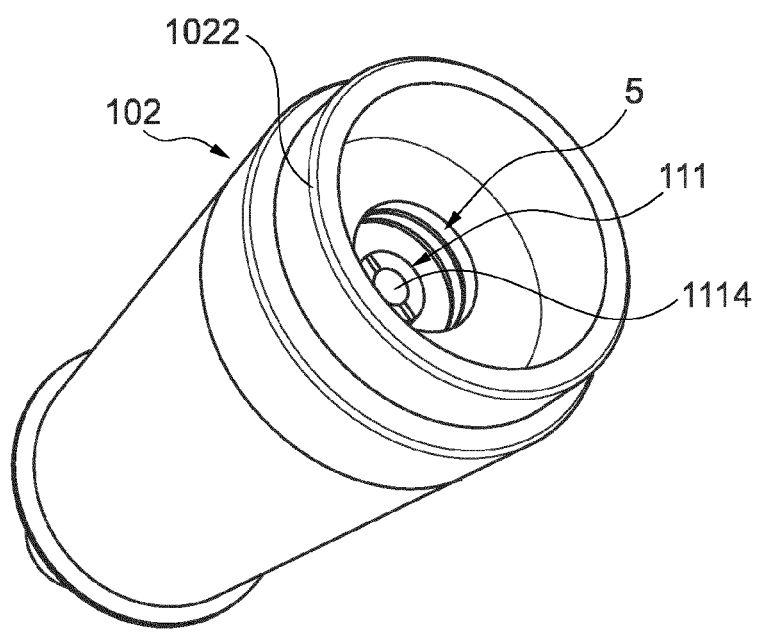
FIG. 31 shows a perspective top view of another embodiment of the device.
Figure 32:
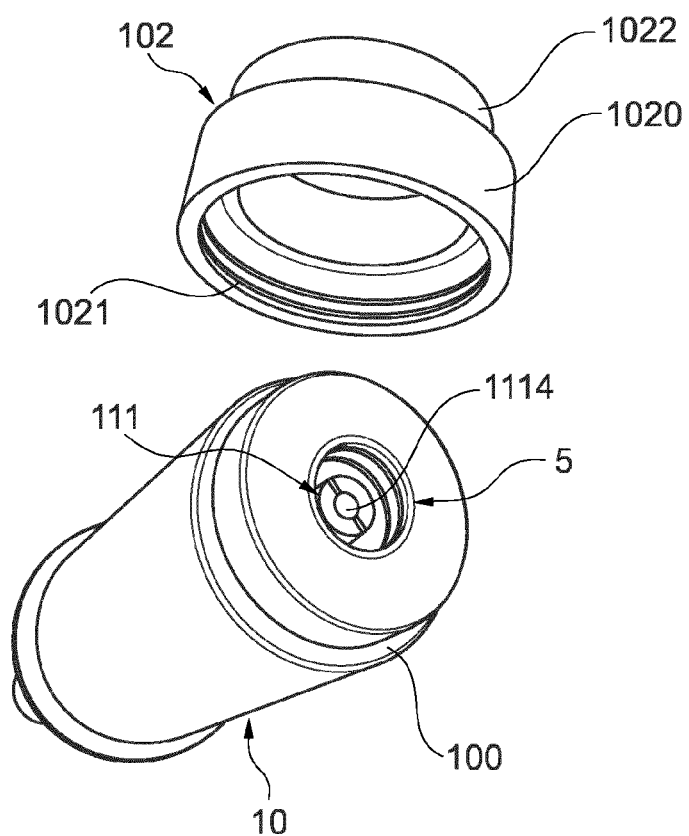
FIG. 32 shows a perspective top view of the embodiment of the device according to FIG. 31 in a disassembled state.

In FIG. 30 another embodiment of the main body (10) of a device is shown. This embodiment differs from the embodiment shown in FIGS. 28 and 29 in that the device comprises an adapter cylinder (101). The adapter cylinder (101) has a cylindrical wall and is open at the top and closed at the bottom. In the bottom a through hole (1010) is provided. The outer diameter of the adapter cylinder (101) corresponds to the inner diameter of the drug container receptacle (5) in the main body (10). In particular, the outer diameter of the adapter cylinder (101) is equal or larger than the inner diameter of the sealing rings (50) provided at the inner diameter of the drug container receptacle (5). Also at the inner diameter of the adapter cylinder (101) sealing rings (50) are provided. The through hole (1010) has a diameter which is equal to or larger than the diameter of the channel (1114) in the ejector punch (111). Once the adapter cylinder (101) has been inserted into the drug container receptacle (5) of the main body (10), the adapter cylinder (101) acts as a receptacle chamber (52) for a drug container (3). Thereby, drug containers (3) of different sizes can be tested with the device, by selecting and inserting an adapter cylinder (101) of an appropriate inner diameter. As the device can include an ejector punch (111), the adapter cylinder (101) can be pushed out of the drug container receptacle (5) and can either be replaced by a different adapter cylinder (101) or a drug container (3) having a larger diameter may be inserted into the drug container receptacle (5) without an adapter cylinder (101). In FIGS. 31 and 32 another embodiment of the main body (10) of the device is shown. This embodiment differs from the embodiment shown in FIGS. 28 and 29 in that a flooding ring (102) is attached to the main body (10). The flooding ring (102) has an attachment section (1020) and a flooding cylinder (1022) extending from the top of the attachment section (1020). The attachment section (1020) has an inner diameter which corresponds to the outer diameter of the main body (10) above the step (100). The height of the attachment section (1020) corresponds to the distance of the step (100) of the main body (10) to the upper end of the main body (10). The flooding cylinder (1022) has an inner diameter which is smaller than the outer diameter of the main body (10) above the step (100). Thereby, the flooding cylinder (1022) rests on the upper surface of the main body (10). At the inner diameter of the attachment section (1020) inner sealing rings (1021) are provided. In the embodiment shown in FIGS. 31 and 32 two inner sealing rings (1021) are provided. By providing the flooding ring (102), a space above the upper end of the main body is created. In the upper end of the main body (10), the drug container receptacle 5 is formed.

With the drug container (3) having been introduced into the drug container receptacle (5), the testing of the leakage between the rubber stopper (2) and the drug container (3) will be performed. If the sealing rings (50), which are provided in the drug container receptacle (5), do not sufficiently seal the lower part of the drug container receptacle (5) from the area above the sealing rings (50), air may be drawn into the drug container receptacle (5), thereby decreasing the quality of the test results. With the flooding ring (102) provided on the main body (10), it will be possible to fill the area above the upper end of the main body (1), with a liquid such as oil. Thereby, drawing in of air into the lower part of the drug container receptacle (5) can be avoided.

According to another embodiment, the flooding ring may be integral with the main body. In this case, the flooding ring can comprise only a flooding cylinder, which is extends from the surface of the upper end of the main body, where the drug container receptacle is formed.

The method according to the invention is suitable to be performed temperature independent.

In one embodiment, the temperature is controlled in the method.

In particular, the method might be performed at constant temperature or at varying temperature. In particular the method is suitable to test the integrity of the closure system, that is of the connection between the rubber stopper (2) and the drug container (3), at typical storage temperatures.

Preferably, the temperature refers to the temperature of the receptacle chamber (52), of the main body (10), of an inner wall of the drug container receptacle (5), of the drug container (3), or of a combination thereof.

It is preferred that the temperature referred to herein refers at least to the temperature of and/or around the neck portion (33) and/or the dispensing opening (30) of the container (3).

In a particular embodiment, the main body (10) and/or the drug container receptacle (5) are temperature controlled.

In some embodiments the method is performed at room temperature. In a specific embodiment the method is performed at 18 to 27° C., preferably at 20 to 26° C., more preferably at 22 to 25° C., even more preferably at about 24 to 25° C.

The method might be performed at higher or lower temperatures than room temperature. In particular, the method might be performed at lower temperatures than room temperature. In some embodiments, the method is performed at 20° C. or less, in other embodiments at 15° C. or less, in further embodiments at 10° C. or less.

In a specific embodiment of the invention, the method is performed at 0° C. to 10° C., preferably 2° C. to 8° C., more preferably 3° C. to 6° C., particularly preferably at 4° C. to 5° C. In a particular embodiment, the method is performed at 4° C.

In some embodiments of the invention, the method is performed below freezing temperature of water. In some embodiments the method is performed at 0° C. or below. In a specific embodiment, the method is performed at −4° C., −5° C., −6° C., −7° C., −8° C., −9° C., −10° C. or below. In some embodiments, the method is performed at −15° C. or below, in particular 20° C. or below.

The method may be performed at even lower temperatures. In some embodiments of the invention, the method is performed at −30° C., −40° C., −50° C., −60° C., −70° C., −80° C., −90° C., −100° C. or below. In a specific embodiment, the method is performed at a temperature of from −70° C. to −90° C., preferably of from −75° C. to −85° C., more preferably the method is performed at −80° C.

If the cooling is based on a mixture of dry ice and isopropyl alcohol, the method might be performed at about −77° C.

If the cooling is based on liquid nitrogen, the method might be performed at about −196° C.

Optionally, the means for temperature control are adapted such that the temperature can be adjusted to more or less any specific chosen temperature.

The method may also be performed at varying temperatures to determine the suitability for the closure system that is of the connection between the rubber stopper (2) and the drug container (3), for different storage and usage conditions. In such an embodiment, the method additionally comprises the step of varying the temperature.

In a specific embodiment, the invention relates to a method for testing the temperature dependence of the integrity of the connection between the rubber stopper (2) and the corresponding drug container (3).

Thereby, the method further may comprise the additional step of controlling the temperature, preferably at for a predetermined period of time. More preferably, the temperature is controlled over the entire time of testing.

In some embodiments of the invention, the temperature is varied sequentially. In other embodiments the temperature is varied continuously. In a preferred embodiment, the temperature is varied continuously, with a linear change of temperature. In a specific embodiment, the temperature is continuously lowered with a linear rate.

The method may optionally comprise the step of identifying at least one threshold temperature, until which safe handling and/or storing of the drug container (3) without affecting the integrity of the connection between rubber stopper (2) and dispensing opening (30) is provided.

In one embodiment, the method is performed at a predetermined temperature. Therefore, a tempering medium, preferably a tempering liquid may be provided, wherein preferably, the tempering medium may be provided with a predefined temperature.

According to some preferred embodiments, the receptacle (5) optionally forms a tempering gap (18), which may be located between the inner wall of the container receptacle (5) and the drug container (3). Preferably, the tempering gap (18) is located opposite to the connection channel (11) with respect to a sealing (50).

Figure 23:
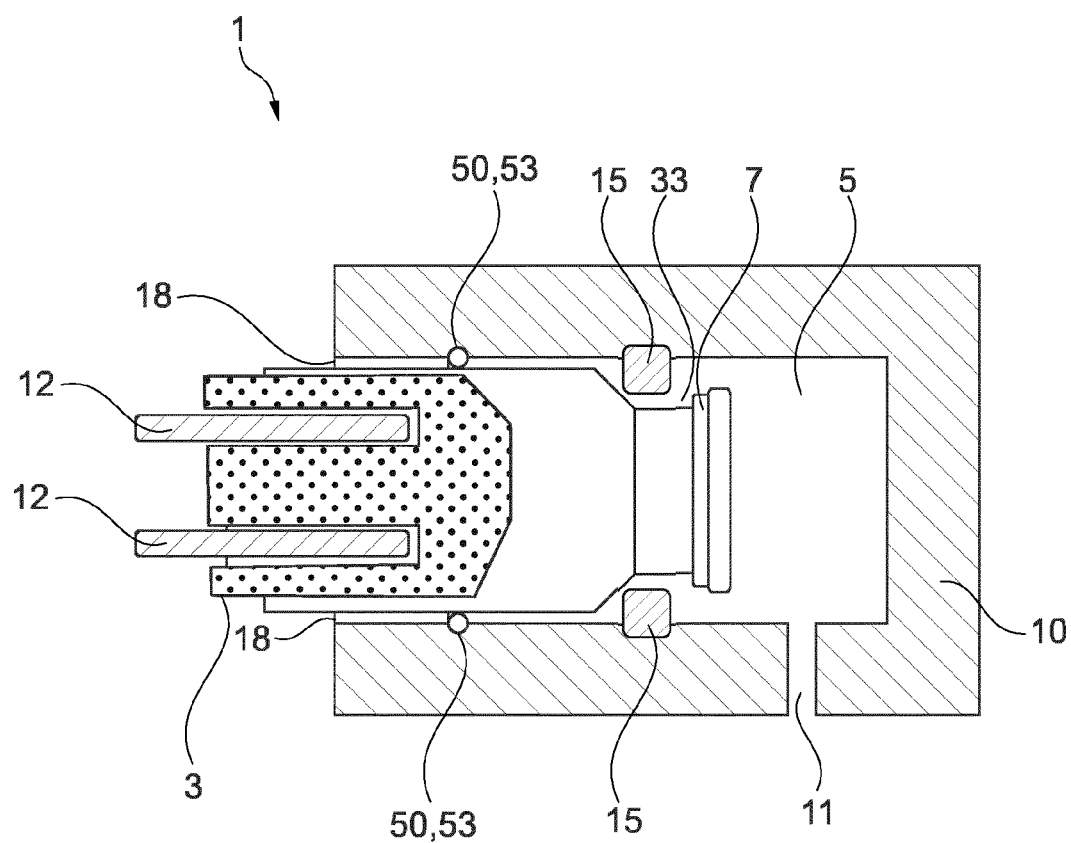
FIG. 23 schematically shows a device according to FIG. 6 comprising a holding device according to FIG. 20.
Figure 24:
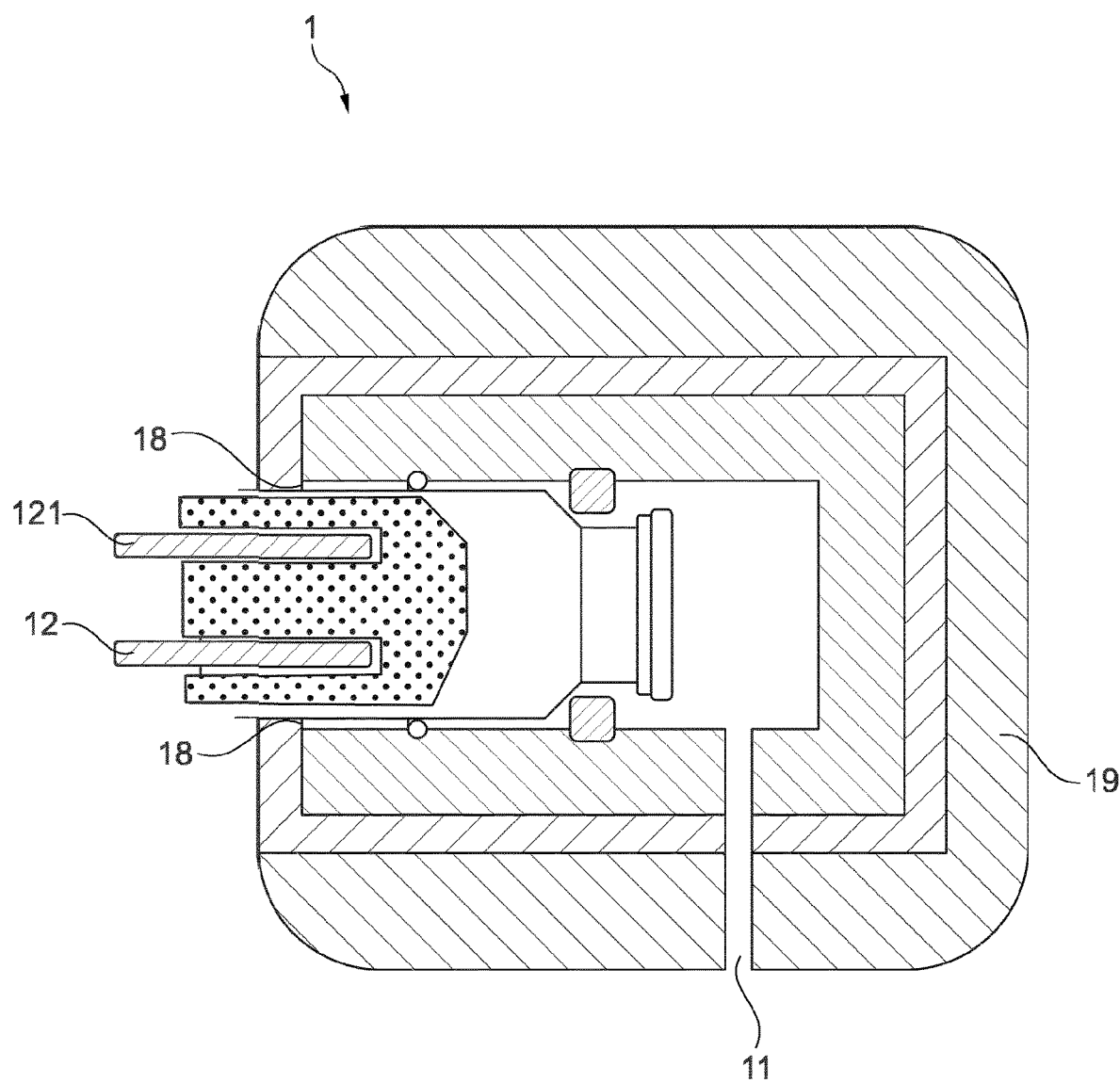
FIG. 24 schematically shows a device according to FIG. 18 comprising a holding device according to FIG. 20.
Figure 25:
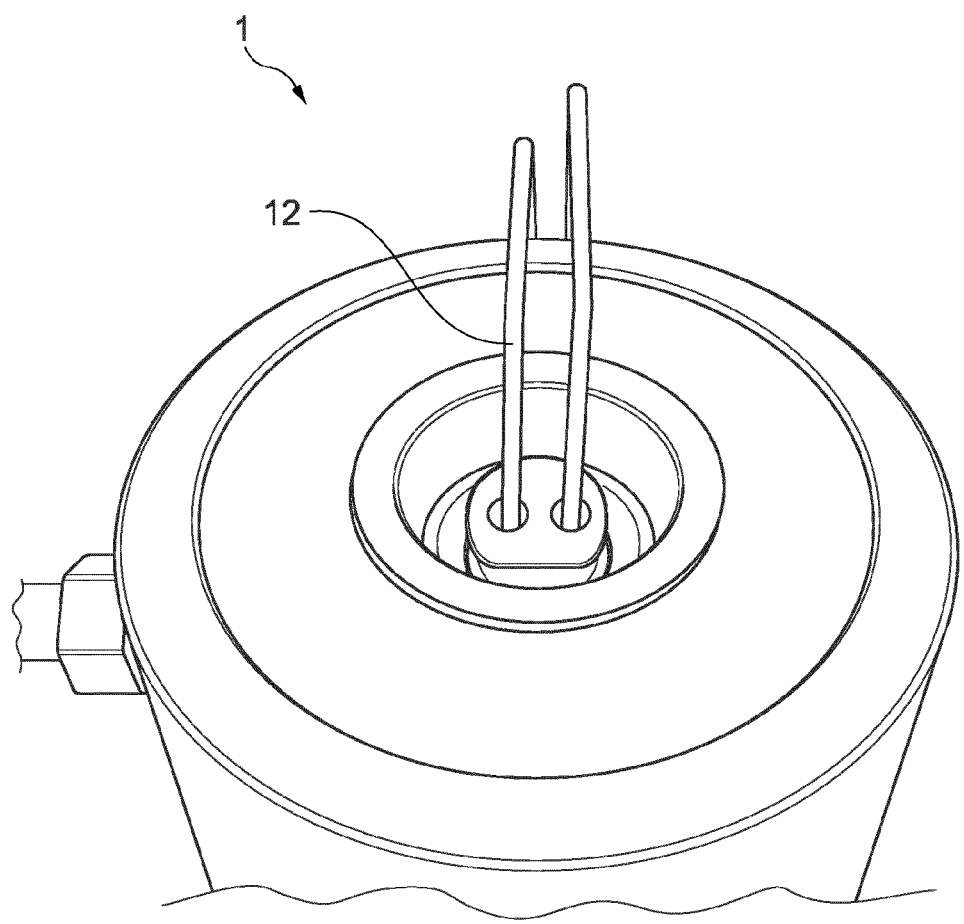
FIG. 25 shows a photograph of the device according to FIG. 24.

In some embodiments of the invention, the tempering medium may be led into the tempering gap (18); see for example FIG. 23.

According to a preferred embodiment, the device comprises means for temperature control in the form of a separate tempering device. Preferably the tempering device is formed such the main body (10) and/or the housing (9) can be inserted into the tempering device.

In some embodiments, the tempering device is a double walled device, wherein preferably the temperature may be controlled by leading tempering medium through the double walled wall at the desired temperature.

Figure 18:
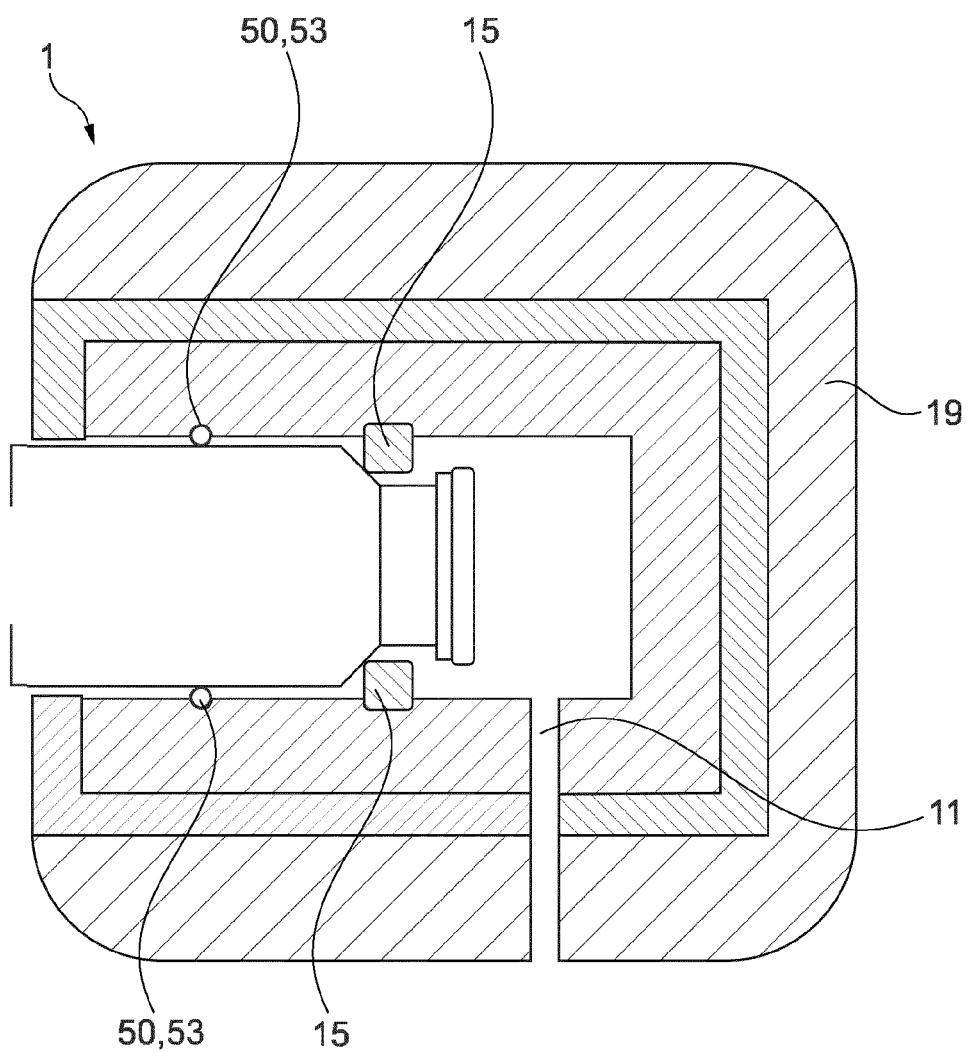
FIG. 18 schematically shows another exemplary embodiment of a device for leakage testing of a connection between a rubber stopper and a corresponding drug container comprising a tempering device (19)
Figure 19:
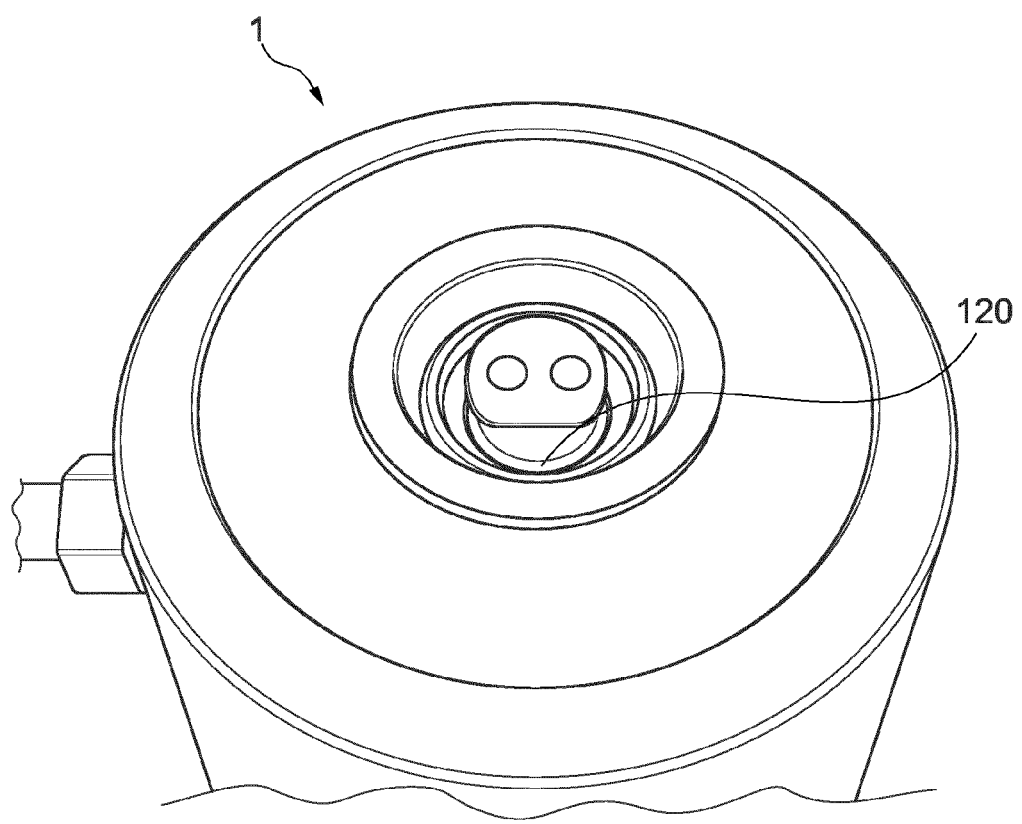
FIG. 19 shows a photograph of the device of FIG. 18.
Figure 20:
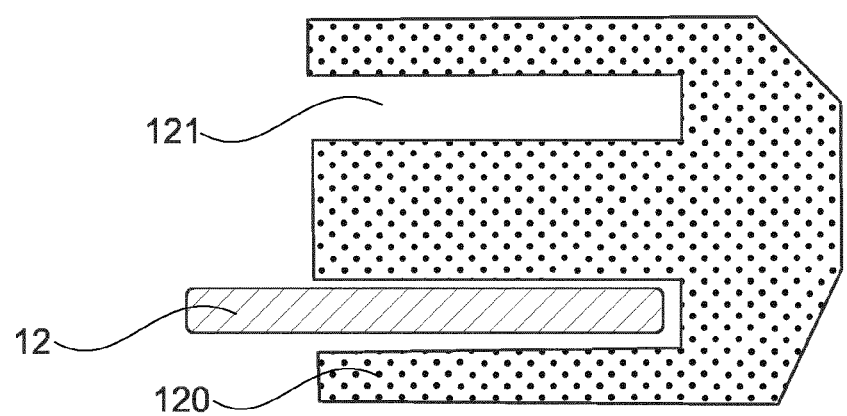
FIG. 20 schematically shows a holding device for holding one or more temperature sensors.
Figure 21:
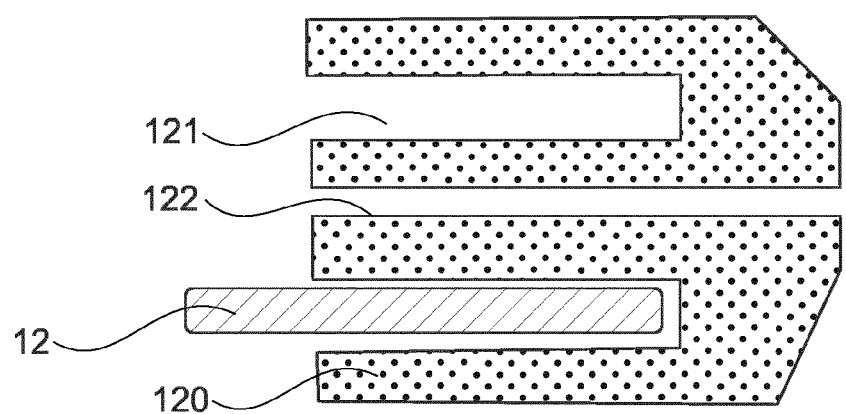
FIG. 21 schematically shows a holding device according to another embodiment.
Figure 22:
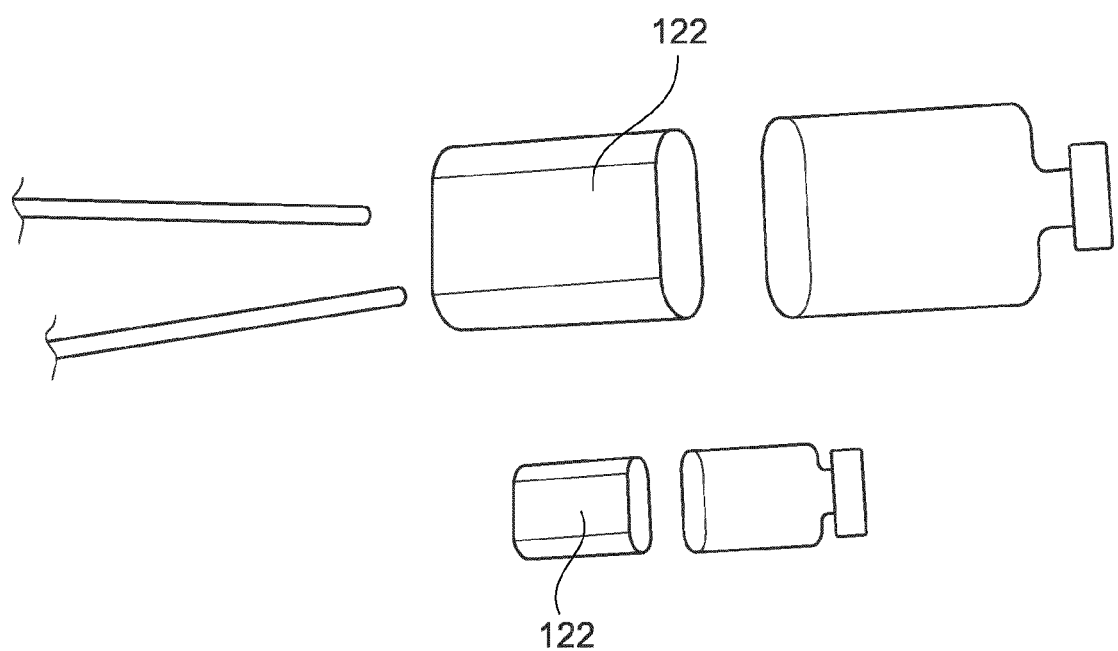
FIG. 22 shows a photograph of the holding device according to FIG. 20.

A schematic view of a device (1) comprising a tempering device (19) can be seen in FIGS. 17 and 18. FIG. 19 shows a photograph of an exemplary embodiment thereof.

According to another preferred embodiment, the device (1) may comprise one or more temperature sensors and/or means for sensor positioning means adapted for positioning one or more temperature sensors into device (1).

In one embodiment, one or more temperature sensors can be placed in or are located in the drug container (3) and/or in the device (1).

The invention further relates to a temperature sensor for use with a device (1) as defined herein, also with all its embodiments.

In one embodiment, the device (1) comprises or is used with a holding device (120) for holding one or more temperature sensors 12 within the drug container (3), wherein preferably, the holding device (120) can be placed in or is located in the drug container (3).

A schematic example of holding device (120) can be seen in FIGS. 20 to 24. In general, a holding device (120) according to the invention comprises at least one opening (121), which allows the insertion of a temperature sensor (12). In some embodiments, holding device (120) has a plurality of openings (121). In some embodiments holding device (120) comprises at least one temperature sensor (12) or has means for placing at least one temperature sensor into holding device (120).

The holding device (120) may preferably be adapted to a specific type of drug container (3), comprising means for measuring the temperature of holding device (120) and comprising at least one means for passing a test medium into said drug container (3).

In some embodiments, said opening (121) can be filled with tempering medium to allow for accurate temperature measurement, for example when tempering medium is filled in the opening (121) then tempering medium mediates the passing of the temperature from holding device (120) to a temperature sensor inserted in the opening (121).

The holding device (120) may be made from any suitable material but is preferably made of metal.

In some embodiments holding device (120) may be configured to be inserted into the drug container (3). At least in this case, preferably the holding device (120) may comprise a passing section (122) for allowing test medium to pass into the drug container (3) (see e.g. FIG. 21 or 22).

The holding device (120) may also comprise or can be connected to a device for temperature control.

The invention further relates to a computer program comprising instructions which, when the program is executed by the computing device described above cause the computing device to acquire any status of and/or to cause the device (1) and/or the displacement device (7) to perform at least step d) of any of the methods of the invention, with the device (1), the displacement device (7) and the methods of the invention as described herein, also with all their embodiments.

Preferably, the computer program comprises instructions to acquire any status of and/or to cause the device (1) and/or the displacement device (7), with the device (1) and/or the displacement device (7) comprising means for temperature control, to perform any of the methods of the invention, with the device (1), the displacement device (7), the methods of the invention and the means for temperature control as described herein, also with all their embodiments The invention further relates to a computer-readable medium having stored thereon the computer program as defined herein, also with all its embodiments.

Except for embodiments and features described herein, the detection unit (6) according to the present invention might be based on a testing device known in the prior art. Such testing devices for leak detection in container closure integrity testing are known to the person skilled in the art. In general, these testing devices are based on mass spectrometric He detection.

It will be obvious for a person skilled in the art that these embodiments and items only depict examples of a plurality of possibilities. Hence, the embodiments shown here should not be understood to form a limitation of these features and configurations. Any possible combination and configuration of the features described herein can be chosen according to the scope of the invention.

LIST OF REFERENCE NUMERALS

1 device
2 rubber stopper
20 collar
21 insertion section
3 drug container
30 dispensing opening
31 communication opening
32 opening direction
33 neck portion
34 outer diameter
35 shoulder
36 interior
37 collar
4 test medium
5 drug container receptacle
50 sealing
51 linear guide
52 receptacle chamber
53 guiding
6 detection unit
7 displacement device 70 support member
700 thread
701 circular ring section
702 inner diameter
703 support section
704 lateral opening
705 contact area
71 movement member
710 thread
711 circular ring section
713 collar section
714 central hole
715 threaded rod
716 tooth
717 width
718 contact area
72 movement direction
73 linear travel
75 distance
8 movement unit
80 gear wheel
9 housing
10 main body
100 step
101 adaptor cylinder
1010 through hole
1011 sealing ring
102 flooding ring
1020 attachment section
1021 inner sealing ring
1022 flooding cylinder
11 connection channel
110 flange
111 ejector punch
1110 pipe
1111 head
1112 foot
1113 slot
1114 channel
12 temperature sensor
120 holding device
121 opening
122 passing section
13 test medium supply
14 syringe or nozzle or needle type injector
15 positioning unit
16 down-holding unit
17 injector
18 gap
19 tempering device

EXAMPLES

A hole was drilled into the bottom of a vial providing a communication opening (31). A displacement device (7) with the support member (70) and the movement member (71) arranged in a screwed-in position relative to each other was placed onto the neck portion (33) of the vial. The displacement device (7) was brought into the initial position by rotating the movement member (71) relative to the support member (70), until the support member (70) made contact with the shoulder (35) of the vial. A rubber stopper was inserted into the dispensing opening (3) of the vial until the collar (20) of the rubber stopper made contact with the collar section (713) of the movement member (71).

Vial, rubber stopper (2) and displacement device (7) are shown separated from each other in FIG. 8.

The vial was inserted into a device (1) as shown in FIG. 7, so device (1) is a device where the vial is inserted bottom first, so device (1) is of the type as the one shown schematically in FIG. 1.

Device (1) had two sealings (50) in form of O-rings.

The test medium was applied to the exterior of the connection region between the vial and the rubber stopper with a needle type injector as shown in FIG. 7, the needle type injector injected the test medium through a lateral opening (704), which is displayed in FIG. 9, into the interior of the displacement device (7), thereby filling the space between the neck portion (33) of the drug container (3), that is the connection region between the vial and the rubber stopper (2), and the displacement device (7) with test medium.

The test medium was helium, in case of passing of helium through the dispensing opening (30) due to leakage between the rubber stopper (2) and the vial, the helium left device (1) through the connection channel (11) and was detected with a mass spectrometer connect to the connection channel (11).

The width (717) of the collar section (713) of the movement member (71) was 0.5 mm, so the rubber stopper was located in the initial position at a distance of 0.5 mm from the collar section (713).

For carrying out the leakage test at a distance of 0 mm, the vial with the rubber stopper was inserted into device (1) without a displacement device (7).

The lead of the threads of the support member (70) and the movement member (71) was 1 mm.

By turning the movement member (71) for respective angles, He was detected at the respective distances, that is a turning of 90° resulted in a travel distance of 0.25 mm.

He flow rates were detected in [mbar*L/s]. with for example "5.00E-08" in the tables meaning "$5.00*10^{-8}$".

Two vials were tested, one vial with the size of standardized type 2R, the other vial with the size of 20R.

Four different rubber stoppers S1 to S4 for the 2R vial and six different rubber stoppers S5 to S10 for the 20R vials were tested, all rubber stoppers are available on industrial scale and are used by the respective industries. The 10 rubber stoppers were from two companies A and B:

For the 2R vial:
S1 and S2: Company A
S2 and S4: Company B
For the 20R vial:
S5, S6 and S9: Company A
S7, S8 and S10: Company B Table 1 shows the detected He rates detected at various distances between various rubber stoppers (2) and the vial (3) for the vial:

2.00 ml Fiolax Clear 35.00×16.00/1.00 mm, Schott AG, 95666 Mitterteich. Germany, So the vial had a size designation of 2R; 2R has an outer diameter (34) of the neck portion (33) of 13 mm and an out diameter of the body of the vial of 16 mm.

Figure 26:
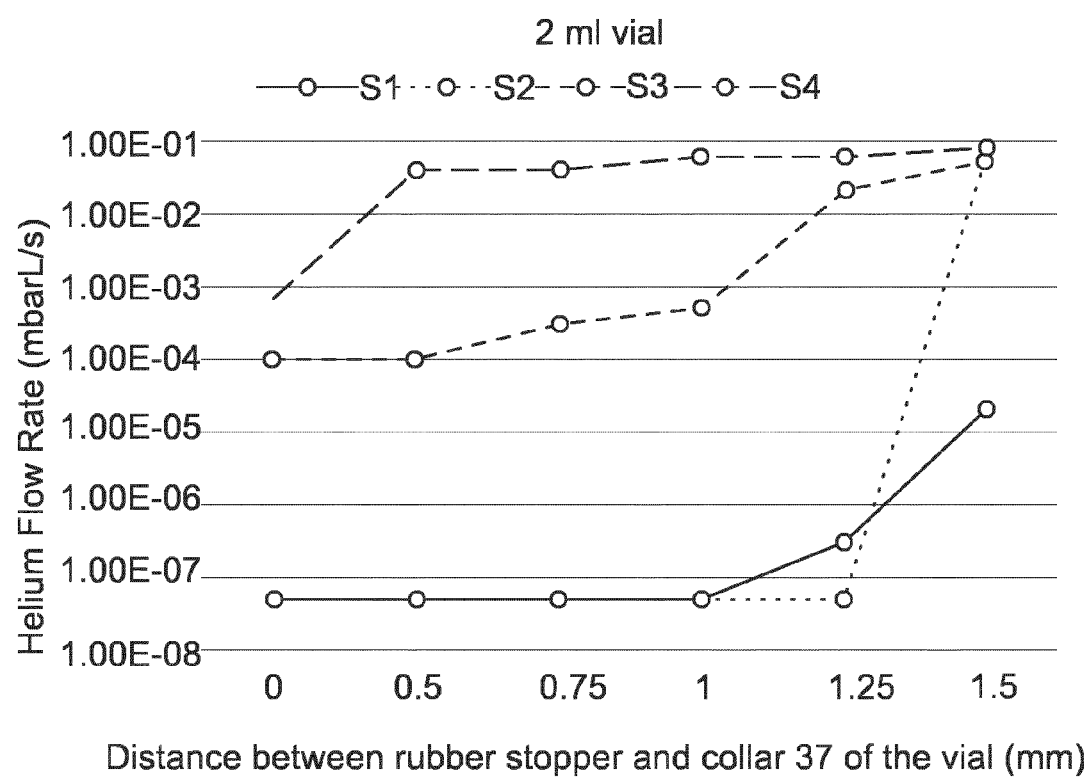
FIG. 26 shows a line chart of a helium detected flow rate through the connection between a drug container and a rubber stopper versus the distance between rubber stopper and collar 37 of the vial according to the example with a 2R vial.

The displacement device in this experiment had the support member (70) containing a substantially circular ring section (701) comprising an inner diameter (702) of 13.10 mm FIG. 26 shows the He flow rates of Table 1 graphically.

TABLE 1

| Rubber stopper | Distance | | | | | |
|---|---|---|---|---|---|---|
| | 0 mm | 0.5 mm | 0.75 mm | 1 mm | 1.25 mm | 1.5 mm |
| S1 | 5.00E−08 | 5.00E−08 | 5.00E−08 | 5.00E−08 | 3.00E−07 | 2.00E−05 |
| S2 | 5.00E−08 | 5.00E−08 | 5.00E−08 | 5.00E−08 | 5.00E−08 | 6.00E−02 |
| S3 | 1.00E−04 | 1.00E−04 | 3.00E−04 | 5.00E−04 | 2.00E−02 | 5.00E−02 |
| S4 | 7.00E−04 | 4.00E−02 | 4.00E−02 | 6.00E−02 | 6.00E−02 | 8.00E−02 |

Table 2 shows the detected He rates detected at various distances between various rubber stoppers (2) and the vial (3) for the vial:

20.00 ml Fiolax Clear 55 mm×30 mm/1.2 mm, Blowback shape, Schott AG, 95666 Mitterteich, Germany.

So the vial had a size designation of 20R, 20R has an outer diameter (34) of the neck portion (33) of 20 mm and an out diameter of the body of the vial of 30 mm.

The displacement device (7) in this experiment had the support member (70) containing a substantially circular ring section (701) comprising an inner diameter (702) of 20.10 mm.

Figure 27:
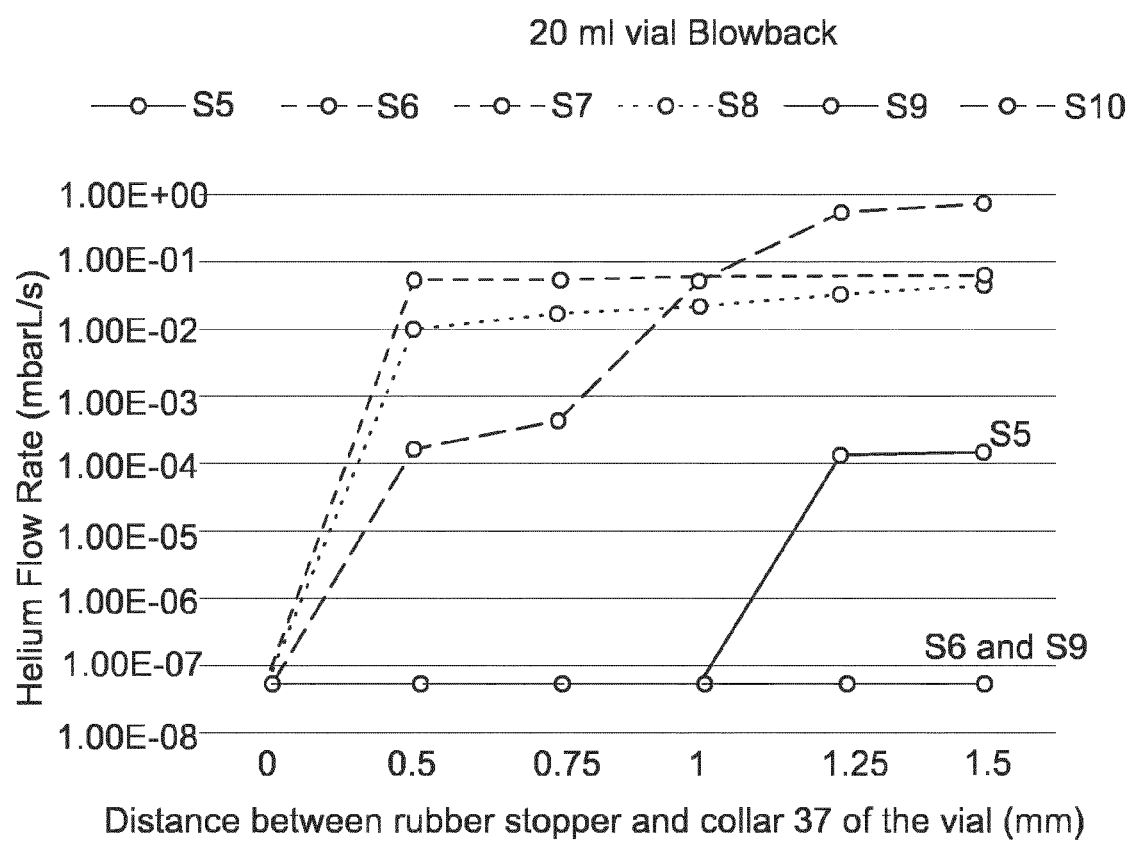
FIG. 27 shows a line chart of a helium detected flow rate through the connection between a drug container and a rubber stopper versus the distance between rubber stopper and collar 37 of the vial according to the example with a 20R vial.

FIG. 27 shows the He flow rates of Table 1 graphically. The lines of S6 and S9 overlap.

TABLE 2

| Rubber stopper | Distance | | | | | |
|---|---|---|---|---|---|---|
| | 0 mm | 0.5 mm | 0.75 mm | 1 mm | 1.25 mm | 1.5 mm |
| S5 | 5.00E−08 | 5.00E−08 | 5.00E−08 | 5.00E−08 | 1.27E−04 | 1.38E−04 |
| S6 | 5.00E−08 | 5.00E−08 | 5.00E−08 | 5.00E−08 | 5.00E−08 | 5.00E−08 |
| S7 | 9.00E−08 | 4.80E−02 | 4.80E−02 | 5.40E−02 | 5.60E−02 | 5.60E−02 |
| S8 | 8.00E−08 | 8.68E−03 | 1.45E−02 | 1.93E−02 | 2.93E−02 | 3.93E−02 |
| S9 | 5.00E−08 | 5.00E−08 | 5.00E−08 | 5.00E−08 | 5.00E−08 | 5.00E−08 |
| S10 | 5.00E−08 | 1.50E−04 | 4.00E−04 | 4.50E−02 | 4.60E−01 | 6.40E−01 |

A predetermined threshold distance of 1 mm was assumed, and He flow rates higher than $1 \times 10^{-7}$ mbar*L/s were considered as indicating a leakage between the rubber stopper and the vial, so for example S1 was tight until a distance of 1 mm, at a distance of 1.25 mm a leak had occurred and He was detected.

The example illustrates clearly, that rubber stoppers have different performances with respect to CCI. If a predetermined threshold travel was set by a regulatory authority to be 1 mm, meaning that there must not be a leakage even when the rubber stopper is displaced up to 1 mm from the collar 37 of the vial, For the 2R vial:
S1 and S2 of Company A are tight up to 1 mm and would therefore qualify
S2 and S4: Company B are not tight up to 1 mm and would therefore not qualify For the 20R vial:
S5, S6 and S9: Company A are tight up to 1 mm and would therefore qualify
S7, S8 and S10: Company B are not tight up to 1 mm and would therefore not qualify

The invention claimed is:

1. A device for leakage testing of a connection between a rubber stopper and a corresponding drug container, wherein the device comprises a displacement device and
a drug container receptacle,
wherein
the drug container receptacle is a receptacle for receiving at least part of the drug container, which has a dispensing opening and a communication opening for enabling fluid communication of the exterior of the drug container with an interior of the drug container apart from its dispensing opening, when the rubber stopper is inserted into the dispensing opening,
characterized in that
the displacement device is a device for providing a displacement of the rubber stopper, which is inserted into the dispensing opening of the drug container, relative to the drug container in an opening direction, and
the displacement device comprises a support member for supporting the displacement device against the drug container and a movement member for supporting the displacement device against the rubber stopper, wherein the movement member is movable relative to the support member in the opening direction,
wherein the support member and the displacement member comprise complementarily formed threads engaging with each other, which are configured such that a rotation of the movement member relative to the support member or vice versa results in a linear travel of the movement member relative to the support member in the opening direction.

2. The device according to claim 1, wherein the drug container is a vial or a cartridge.

3. The device according to claim 1, wherein the displacement device is configured to be placed exteriorly onto a neck portion of the drug container.

4. A computing system, configured to acquire any status of and/or control the displacement device, and/or the device, as defined in claim 1.

5. A non-transitory computer-readable medium having stored thereon a computer program, the computer program comprising instructions which, when the program is executed by a computing system or a computer, cause the computing system or computer to acquire any status of and/or to cause the device and/or the displacement device to perform:
- d) displacing the rubber stopper relative to the drug container in an opening direction for a chosen distance with the displacement device while measuring any presence of the test medium either in the interior or, alternatively, in the exterior of the drug container that has passed through the dispensing opening;

with the device as defined in anyone of claim 1.

6. A method for leakage testing of a connection between a rubber stopper and a corresponding drug container, characterized in that the method comprises the steps of:
- a) providing a drug container with a communication opening for enabling fluid communication of an exterior of the drug container with the interior of the drug container apart from its dispensing opening,
- b) closing the dispensing opening of the drug container with the robber stopper,
- c) exposing either the exterior of the drug container or, alternatively, the interior of the drug container at least at a connection region of the drug container and the rubber stopper inserted into the dispensing opening of the drug container to a test medium, and
- d) displacing the rubber stopper relative to the drug container in an opening direction for a chosen distance with the displacement device while measuring any presence of the test medium either in the interior or, alternatively, in the exterior of the drug container that has passed through the dispensing opening;

and wherein after having closed the dispensing opening with the rubber stopper, the movement member is rotated relative to the support member, or vice versa.

7. The method according to claim 6, wherein the displacement device is placed exteriorly onto the neck portion of the drug container prior to closing the dispensing opening with the rubber stopper.

8. The method according to claim 6, wherein the method comprises the step of inserting the drug container into the drug container receptacle of device.

* * * * *